(12) United States Patent
Zhao et al.

(10) Patent No.: US 10,968,559 B2
(45) Date of Patent: Apr. 6, 2021

(54) SUPPORT FOR HOUSEHOLD APPLIANCE, AND HOUSEHOLD APPLIANCE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 23 days.

(21) Appl. No.: 16/467,239

(22) PCT Filed: Jun. 29, 2017

(86) PCT No.: PCT/CN2017/090843
§ 371 (c)(1),
(2) Date: Jun. 6, 2019

(87) PCT Pub. No.: WO2018/126619
PCT Pub. Date: Jul. 12, 2018

(65) Prior Publication Data
US 2019/0330789 A1    Oct. 31, 2019

(30) Foreign Application Priority Data

Jan. 6, 2017    (CN) .......................... 201710010922.4

(51) Int. Cl.
*D06F 39/12*    (2006.01)
*F15B 7/02*    (2006.01)
*F15B 15/10*    (2006.01)

(52) U.S. Cl.
CPC .............. *D06F 39/125* (2013.01); *F15B 7/02* (2013.01); *F15B 15/10* (2013.01)

(58) Field of Classification Search
CPC ........... D06F 39/125; F15B 7/02; F15B 15/10
See application file for complete search history.

(56) References Cited

U.S. PATENT DOCUMENTS 1,319,554 A    10/1919    Anderson
2,635,838 A    4/1953    Branson
(Continued)

FOREIGN PATENT DOCUMENTS

CN    101995885 A    3/2011
CN    202989586 U    6/2013
(Continued)

OTHER PUBLICATIONS

International Search Report (PCT/ISA/210) and translation and Written Opinion (PCT/ISA/237) dated Oct. 13, 2017, by the Chinese Patent Office as the International Searching Authority for International Application No. PCT/CN2017/090843.
(Continued)

*Primary Examiner* — Anita M King
(74) *Attorney, Agent, or Firm* — Buchanan Ingersoll & Rooney PC

(57) ABSTRACT

A support for household appliance comprises a hydraulic plate internally provided with a liquid flow passage, a sheath fixedly connected with the hydraulic plate, a regulating support arranged in the sheath and axially movable relative to the sheath, an accommodation chamber is formed by the hydraulic plate, the sheath and the regulating support. A flexible accommodation body that accommodates a liquid medium in the accommodation chamber extends and retracts to drive the regulating support to move in the sheath for leveling under the action of pressure. The flexible accom-
(Continued)

modation body is provided with an mounted on the hydraulic plate through the sheath in a sealed manner and communicates with the a liquid flow passage. The hydraulic medium in the flexible accommodation body can circulate into the liquid flow passage and flow to the liquid outlet nozzle through the a liquid flow passage, and thus, among household-appliance-used bottom feet for automatic leveling.

10 Claims, 15 Drawing Sheets

(56) References Cited

U.S. PATENT DOCUMENTS

| | | | | |
|---|---|---|---|---|
| 4,625,424 A * | 12/1986 | de la Haye | | G12B 5/00 |
| | | | | 248/649 |
| 6,009,815 A * | 1/2000 | Hartman | | A47B 91/02 |
| | | | | 108/147 |
| 8,104,724 B2 | 1/2012 | Sorohan | | |
| 8,302,743 B2 * | 11/2012 | Pike | | F16M 7/00 |
| | | | | 188/151 R |
| 9,909,709 B2 * | 3/2018 | Pike | | E06C 7/426 |
| 10,221,517 B2 * | 3/2019 | Zhao | | F16F 9/065 |
| 10,227,723 B2 * | 3/2019 | Zhao | | A47B 91/16 |
| 10,294,602 B2 * | 5/2019 | Zhao | | D06F 39/12 |
| 10,605,324 B2 * | 3/2020 | Zhao | | D06F 39/125 |
| 10,626,541 B2 * | 4/2020 | Zhao | | F16M 7/00 |
| 10,704,179 B2 * | 7/2020 | Zhao | | D06F 37/245 |
| 10,711,388 B2 * | 7/2020 | Zhao | | D06F 37/20 |
| 10,738,932 B2 * | 8/2020 | Zhao | | A47L 15/4253 |
| 10,745,850 B2 * | 8/2020 | Zhao | | D06F 37/20 |
| 2007/0023590 A1 | 2/2007 | Lotz | | |
| 2010/0224742 A1 | 9/2010 | Sorohan | | |
| 2018/0271279 A1 * | 9/2018 | Ozagir | | A47B 91/16 |
| 2018/0328438 A1 * | 11/2018 | Zhao | | D06F 39/125 |
| 2018/0355546 A1 | 12/2018 | Zhao | | |
| 2019/0203799 A1 * | 7/2019 | Zhao | | F16F 15/023 |
| 2019/0330789 A1 | 10/2019 | Zhao et al. | | |
| 2020/0141046 A1 * | 5/2020 | Zhao | | F16M 7/00 |
| 2020/0173095 A1 * | 6/2020 | Zhao | | F16F 15/022 |

FOREIGN PATENT DOCUMENTS

| | | |
|---|---|---|
| CN | 104534788 A | 4/2015 |
| CN | 105645322 A | 6/2016 |
| CN | 105755750 A | 7/2016 |
| CN | 105755757 A | 7/2016 |
| CN | 105757408 A | 7/2016 |
| CN | 105858536 A | 8/2016 |
| CN | 205603172 U | 9/2016 |
| CN | 205634820 U | 10/2016 |
| CN | 205636216 U | 10/2016 |
| CN | 205640067 U | 10/2016 |
| CN | 205775399 U | 12/2016 |
| DE | 1954924 U | 2/1967 |
| DE | 10156397 A1 | 5/2003 |
| WO | 2008/129065 A2 | 10/2008 |

OTHER PUBLICATIONS

Extended Search Report issued by the European Patent Office in corresponding European Patent Application No. 17890094.0-1018 dated Sep. 19, 2019 (7 pages).

Extended Search Report issued by the European Patent Office in corresponding European Patent Application No. 17890506.3-1018 dated Dec. 13, 2019 (7 pages).

International Search Report (PCT/ISA/210) and translation and Written Opinion (PCT/ISA/237) dated Sep. 28, 2017, by the Chinese Patent Office as the International Searching Authority for International Application No. PCT/CN2017/090840.

* cited by examiner

SUPPORT FOR HOUSEHOLD APPLIANCE, AND HOUSEHOLD APPLIANCE

TECHNICAL FIELD

The present disclosure relates to a technical field of support leveling of household appliances, and specifically relates to a support for household appliance, and a household appliance.

BACKGROUND

Generally, leveling devices are arranged at bottoms of shells of the household appliances, the household appliances can achieve a stable placed state through regulating the leveling devices when the household appliances are placed, and the leveling devices can support the household appliances and keep the household appliances stable after the household appliances are placed in a leveled manner.

Taking a washing machine for example, bolt bottom feet are generally mounted at the bottom of a shell or whole set of the existing washing machine, each bolt support comprises a lead screw, a nut gasket and a rubber pad. The nut gaskets can be screwed up and down on the lead screws, the lead screws can also be screwed up and down in screw holes of a bottom plate of the shell, and the height regulating of the washing machine is achieved through lengths of the lead screws of the bolt bottom feet screwed in the screw holes of the bottom plate; for a majority of washing machines, heights are increased through counterclockwise rotation of the bottom feet, the heights are reduced through clockwise rotation of the bottom feet; and after the heights of the bolt bottom feet are regulated, the nut gaskets for preventing loosening are screwed down to keep steadiness.

For the bottom feet of the washing machine, although the leveling of the washing machine is achieved, users are required to carry out manual regulation, and user operation is extremely inconvenient if the dead weight of the washing machine is relatively heavy or a setting space is narrow and small. In addition, during the long-term working of the washing machine, vibration also acts on the leveling bottom feet, the supporting failure of the leveling bottom feet is easily caused, and thus, the out-of-flat placement of the washing machine is caused.

For example, the existing 8 KG drum washing machine is generally about 80 Kg and is relatively heavy, the regulation by customers is extremely inconvenient, the condition that the washing machine is regulated to an optimum state cannot be guaranteed even if the regulation is completed. During the washing, particularly spin-drying dewatering of acceleration to 1400 r/min from 0r/min of the washing machine, great vibration will be caused once the washing machine is not horizontal or suffers from a weak leg problem, and thus, the comfort of use of the customers is greatly affected.

In addition, the vibration caused by the out-of-flat of the washing machine may loosen screws of the bottom feet, supporting brackets of the bottom feet may vertically move, a horizontal state of the washing machine may be changed by the instability, and vibration that is more intensive is caused. Due to the vicious cycle, the noise of the washing machine will become louder and louder in long-time use, certain damage to the washing machine is caused, and the service life of the washing machine is shortened.

Therefore, the leveling of the existing washing machines has the problems of manual regulation, time and labor consuming and relatively poor accuracy.

Taking this into consideration, the present disclosure is provided.

SUMMARY

In order to solve the above problems, a first disclosure object of the present disclosure is to provide a support for household appliance, and concretely, a technical scheme as follows is adopted:

A support for household appliance comprises:

a hydraulic plate, which is internally provided with a liquid flow passage;

a sheath, which is fixedly connected with the hydraulic plate;

a regulating support, which is arranged in the sheath and is axially movable relative to the sheath;

an accommodation chamber, which is formed by the hydraulic plate, the sheath and the regulating support; and a flexible accommodation body, which accommodates a liquid medium and is arranged in the accommodation chamber;

the flexible accommodation body extends and retracts to drive the regulating support to axially move in the sheath for leveling under the action of pressure; and the flexible accommodation body has an opening part, and the opening part is mounted on the hydraulic plate through the sheath in a sealed manner and communicates with the liquid flow passage.

Further, the upper end of the sheath is fixedly connected with the hydraulic plate and tightly presses the opening part of the flexible accommodation body onto the hydraulic plate for sealed connection.

Further, the upper end of the sheath is flanged to form a mounting plane, the mounting plane is fit with the bottom face of the hydraulic plate and is in fastened connection with the bottom face of the hydraulic plate through the connecting device, and the opening part of the flexible accommodation body is tightly pressed to the mounting plane and the bottom face of the hydraulic plate for sealed connection.

Further, the flexible accommodation body comprises an accommodating body, a chamber which is used for accommodating the liquid medium is formed inside the accommodating body, an opening end of the accommodating body outwards extends to form the opening part; and the accommodating body is arranged in the accommodation chamber, and the opening part extends into a connection of the sheath and the hydraulic plate and is tightly sealed.

Further, a hydraulic plate groove is formed in the bottom face of the hydraulic plate, and the opening part of the flexible accommodation body is deformed under pressure of the end part of the sheath and fills the hydraulic plate groove for sealing.

Preferably, a volume enclosed by the end part of the sheath and the hydraulic plate groove is smaller than the volume of the opening part of the flexible accommodation body.

Further, a sheath projecting part which bulges from the end face is arranged at the end part of one end, connected with the hydraulic plate, of the sheath, and the opening part of the flexible accommodation body is deformed under pressure of the sheath projecting part and fills the hydraulic plate groove for sealing.

Further, a sheath groove is formed in the end part of one end, connected with the hydraulic plate, of the sheath; the sheath is fastened to the bottom face of the hydraulic plate, and the opening part of the flexible accommodation body deforms under the action of a fastening force and fills the sheath groove for sealing.

Further, a projecting annular bulge is formed on the bottom face of the hydraulic plate, the sheath is fixed to the bottom face of the hydraulic plate, and the opening part of the flexible accommodation body is deformed under pressure of the annular bulge and fills the sheath groove for sealing.

Further, an upper limiting stopper, which is used for preventing the regulating support from excessively moving upwards to be abutted against the flexible accommodation body, is arranged on the internal wall of the sheath.

And/or, one end, sleeved by the sheath, of the regulating support is a smooth transition end.

A second disclosure object of the present disclosure is to provide a household appliance with the support for household appliance according to any one of the above-mentioned items.

According to the support for household appliance, provided by the present disclosure, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

The stability of flowing of liquid is a key for achieving the leveling of the support for household appliance, provided by the disclosure, the opening part 601 of the flexible accommodation body 600 is mounted on the hydraulic plate 100 in a sealed manner while the opening part 601 is fixedly mounted by using the sheath 200; the hydraulic medium in the flexible accommodation body 600 circulates into the liquid flow passage 107 and flows to liquid outlet nozzles 101 through the liquid flow passage 107, and thus, the hydraulic medium can circulate among the household-appliance-used bottom feet for automatic leveling. Therefore, according to the support for household appliance, provided by the disclosure, a sealed mounting structure of the flexible accommodation body 600 is greatly simplified, and the sealing effect is better.

According to the household appliance provided by the present disclosure, by adopting the support for household appliance, automatic leveling is achieved, the mounting is simple and convenient, and the overall vibration and noise of the household appliance are lowered.

Figure 1:
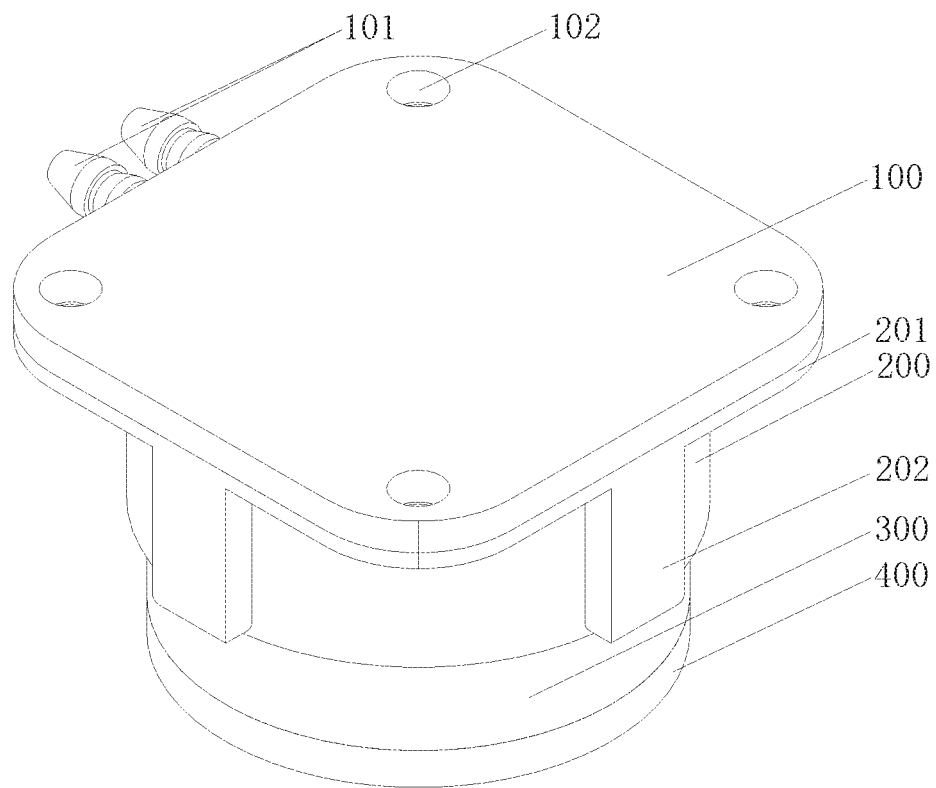
FIG. 1 is a three-dimensional structural top view of a support for household appliance of embodiment I of the present disclosure.
Figure 2:
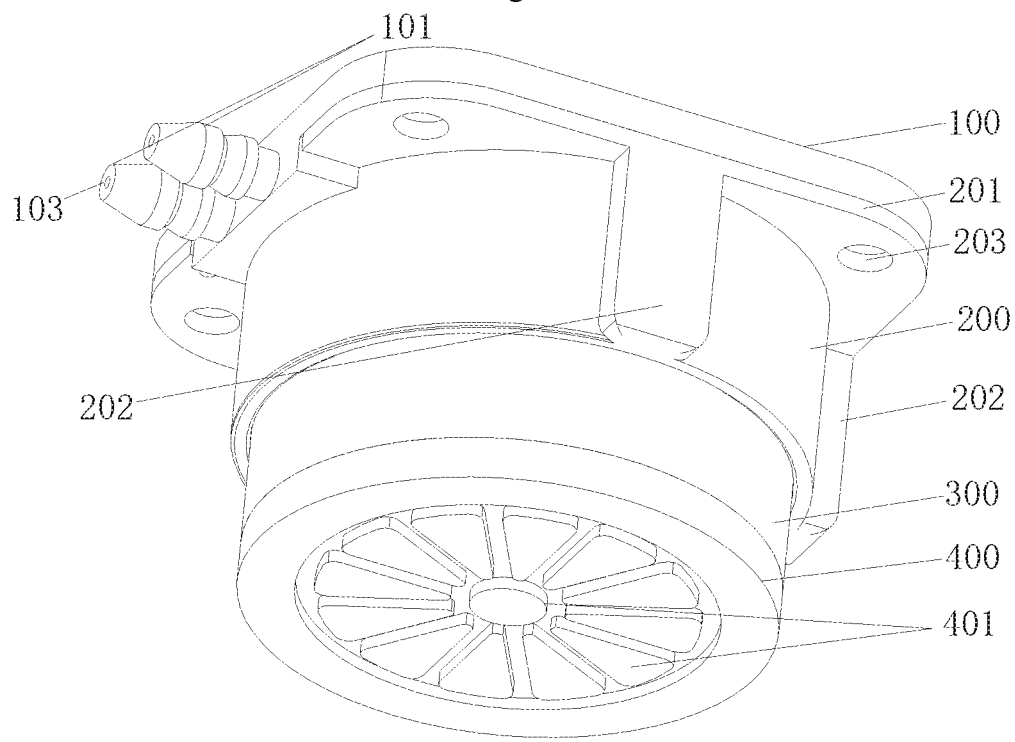
FIG. 2 is a three-dimensional structural upward view of the support for household appliance of embodiment I of the present disclosure.
Figure 3:
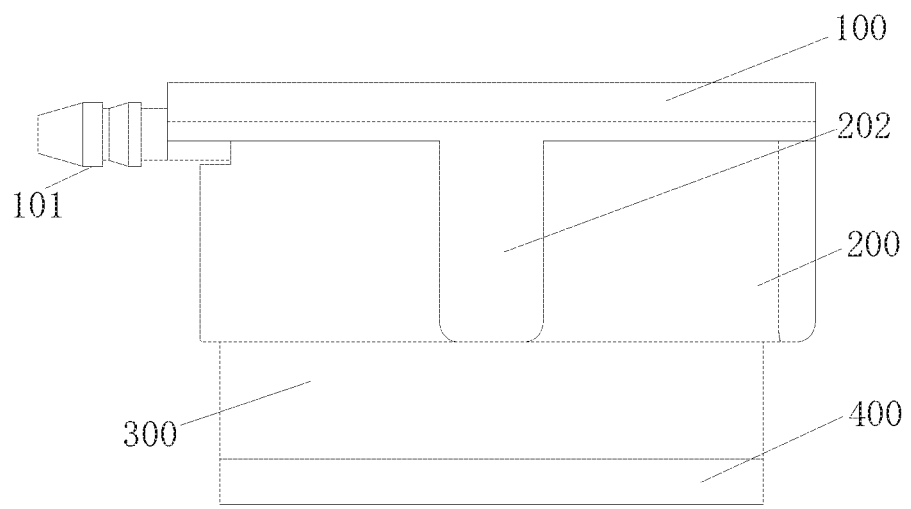
FIG. 3 is a front view of the support for household appliance of embodiment I of the present disclosure.
Figure 4:
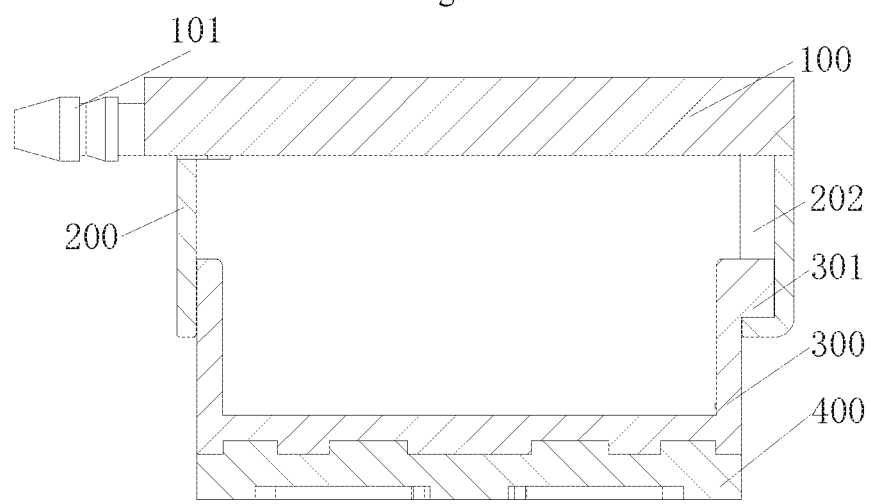
FIG. 4 is a sectional view of the support for household appliance of embodiment I of the present disclosure.
Figure 5:
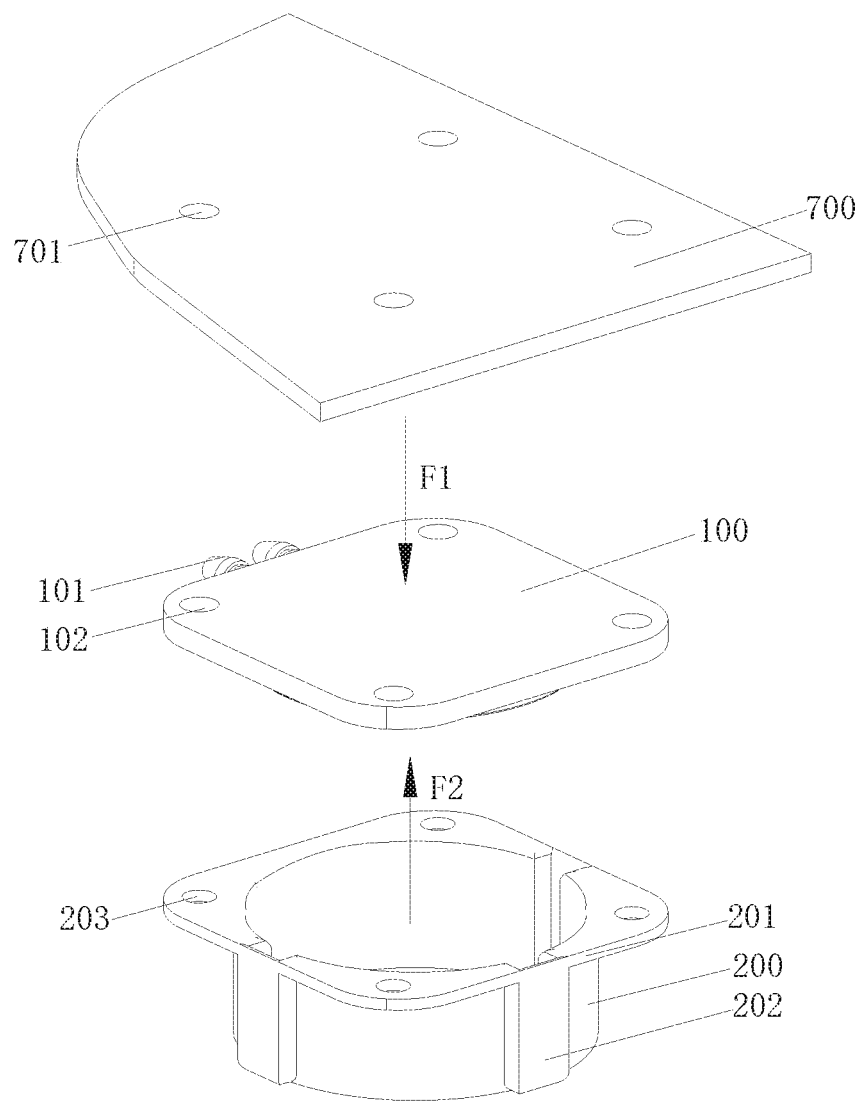
FIG. 5 is a mounting schematic diagram of the support for household appliance of embodiment I of the present disclosure.
Figure 6:
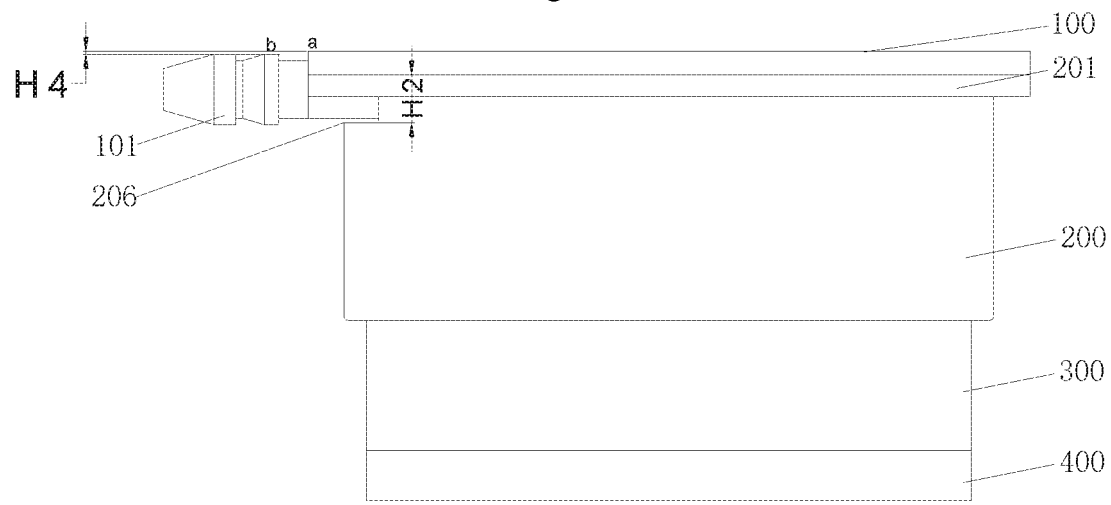
FIG. 6 is a front view of a support for household appliance of embodiment II of the present disclosure.
Figure 7:
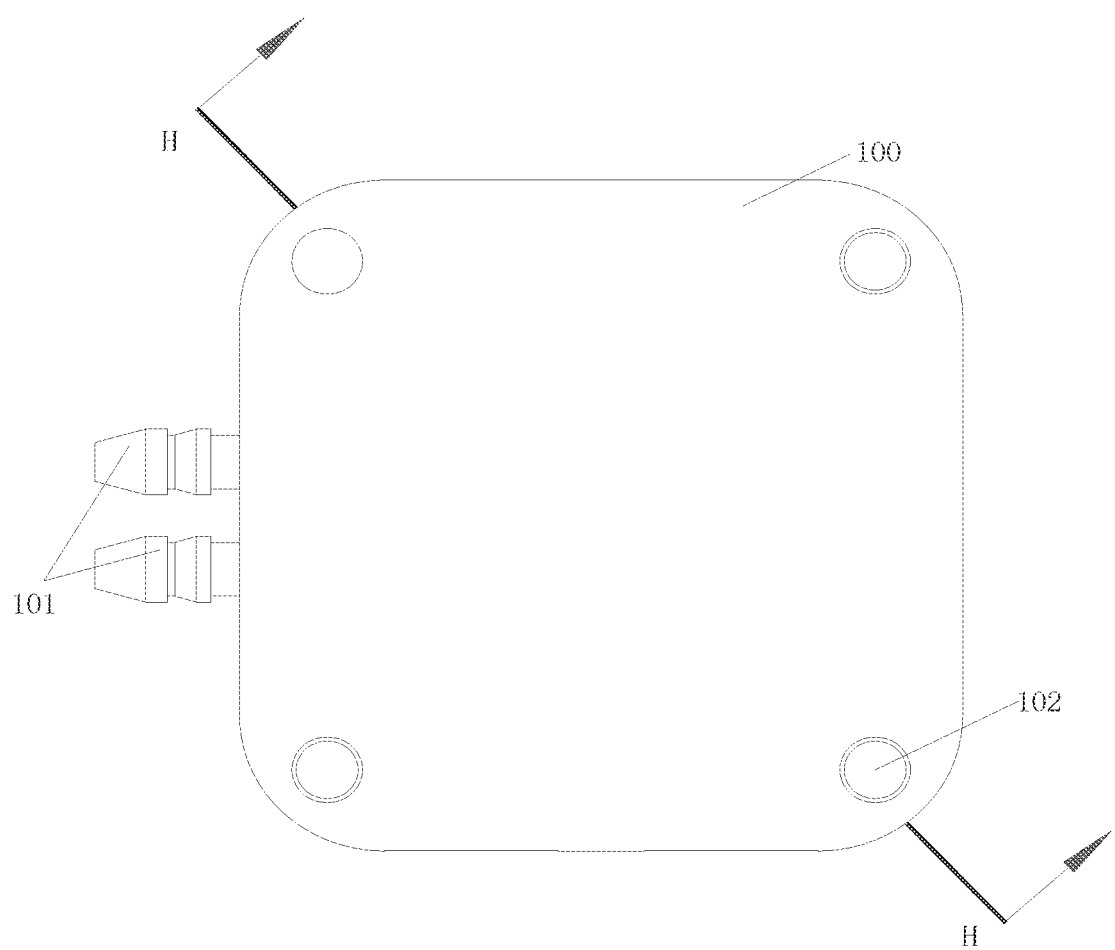
FIG. 7 is a top view of the support for household appliance of embodiment II of the present disclosure.

Reference Signs: 100—hydraulic plate, 101—liquid outlet nozzle, 102—hydraulic plate hole, 103—liquid hole, 104—hydraulic plate groove, 105—annular bulge, 106—second embedding part, 107—liquid flow passage, 108—first embedding part, 109—base part, 110—passage, 200—sheath, 201—mounting plane, 202—guiding limiting groove, 203—sheath hole, 204—sheath projecting part, 205—sheath groove, 206—liquid nozzle outlet, 207—second guiding limiting groove, 208—first guiding limiting groove, 209—stopping part, 300—regulating support, 301—guiding limiting convex portion, 302—first guiding limiting block, 303—second guiding limiting block, 400—rubber gasket, 401—pattern, 500—pressing ring, 501—radial projecting part, 502—axial projecting part, 503—pressing ring groove, 504—annular groove, 505—pressing ring mounting hole, 600—flexible accommodation body, 601—opening part, 602—accommodating body, 603—small-diameter part, 700—bottom plate, 701—mounting hole, 900—snap-in connecting member, 901—snap-in connecting part, 902—reinforcing apron, 903—first fixing hole, 1000—support for household appliance, 1100—high-pressure pipe, 1200—communicating member, 1201—communicating member liquid outlet nozzle, 1202—main cavity, 1203—third fixing hole, 1204—oil charging hole and 1205—flow passage.

DETAILED DESCRIPTION

A support for household appliance and a household appliance provided by the present disclosure are described in detail below with reference to the drawings.

Embodiment I

Referring to FIG. 1 to FIG. 5, a support for household appliance comprises:

a hydraulic plate 100, which is fixed to the bottom of the household appliance; a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body, which accommodates a liquid medium and is arranged in the accommodation chamber; and the flexible accommodation body extends and retracts to drive the regulating support 300 to axially move in the sheath 200 for leveling under the action of pressure.

According to the support for household appliance, provided by this embodiment, based on the hydraulic principle, the accommodation chamber is formed by the hydraulic plate 100, the sheath 200 and the regulating support 300, and the flexible accommodation body which accommodates the liquid medium is arranged in the accommodation chamber. So that for different pressures resulting from unflatness, the support for household appliance performs adaptive regulation automatically by means of the fluidity of the hydraulic medium; and the liquid medium circulates among all bottom feet, so that the range of regulation is wider, and the effect of regulation is better.

According to the support for household appliance, provided by this embodiment, the hydraulic plate 100 is directly fixed to the bottom of the household appliance, the sheath 200 and the hydraulic plate 100 are fixedly connected. Thus, the hydraulic plate 100 is clamped by the bottom of the household appliance and the sheath 200, the strength of fixed connection between the hydraulic plate 100 and the sheath 200 is not necessary, a main purpose of connection between the hydraulic plate 100 and the sheath 200 is to form an integrated support, and the strength of the connection is irrelevant to the size of gravity of the household appliance and the size of a supporting force of the regulating support 300. Therefore, for the support for household appliance, provided by the present disclosure, the hydraulic plate 100 and the sheath 200 can be rapidly, reliably and fixedly connected, the requirements on the strength of connection between the hydraulic plate 100 and the sheath 200 are lowered, and the essential space and height required by the connection are further lowered.

In summary, the support for household appliance, provided by this embodiment, is simpler in structure, simpler and more convenient in mounting and has better stability.

In addition, in the structural design of the support for household appliance, provided by this embodiment, the overall height of the support for household appliance can be further lowered, and thus, the support for household appliance has a better shock absorption effect on the household appliance. Taking a washing machine as an example, the support for household appliance, provided by the present disclosure, has a better shock absorption effect on dewatering vibration of the washing machine.

In order to guarantee the stability of mounting of the support for household appliance, provided by the embodiment, and meanwhile lower the overall height of the support for household appliance, as a preferred embodiment of the embodiment, the upper end of the sheath 200 is flanged outward to form a mounting plane 201, and the mounting plane 201 is fit with the bottom face of the hydraulic plate 100 and is fixedly connected with the bottom face of the hydraulic plate 100.

According to the embodiment, the mounting plane 201 of the sheath 200 is fit with the hydraulic plate 100, thus, more pressure is transferred to the mounting plane 201 and is dispersed, and the hydraulic plate 100 is prevented from bearing too high pressure. A liquid flow passage for circulating the hydraulic medium is formed inside the hydraulic plate 100, and the stability of the hydraulic plate 100 is a key of the stabilizing and leveling of the entire support for household appliance. According to the embodiment, the mounting plane 201 is formed by the outward flanging of the upper end of the sheath 200, thus, the mounting contact area of the sheath 200 and the hydraulic plate 100 is increased, and the stability and dispersancy of force transfer to the mounting plane 201 of the sheath 200 from the hydraulic plate 100 are better facilitated.

In addition, the mounting plane 201 of the sheath 200 is fit with the hydraulic plate 100 and is fixedly connected with the hydraulic plate 100, designing mounting structures on the sheath 200 or hydraulic plate 100 is omitted, and the overall structure of the support for household appliance is lowered.

Further, in the embodiment, the outline of the mounting plane 201 is matched with that of the hydraulic plate 100, and the mounting plane 201 is fit with the bottom face of the hydraulic plate 100 and is fixedly connected with the bottom face of the hydraulic plate 100. Thus, a pressure force borne by the hydraulic plate 100 can be better correspondingly transferred to the mounting plane of the sheath 200, stress concentration of local parts of the hydraulic plate 100 caused by the mounting plane 201 is avoided, and the stable circulation of the hydraulic medium in the hydraulic plate is better facilitated.

Preferably, in the embodiment, the outline of the hydraulic plate 100 is similar to or the same as that of the mounting plane 201. Thus, the mounting is simpler and more convenient through corresponding the hydraulic plate 100 and the mounting plane 201.

Concretely, in the embodiment, the sheath 200 comprises an internal hollow sleeve part, one end of the regulating support 300 is sleeved by the sleeve part and the regulating support can axially move relatively. The upper end of the sleeve part is flanged outward to form the mounting plane 201, and the mounting plane 201 is fit with the bottom face of the hydraulic plate 100 and is fixedly connected with the bottom face of the hydraulic plate 100. According to the embodiment, the mounting plane 201 is formed by the outward flanging of the upper end of the sleeve part, the regulating support 300 axially moves in the sheath 200. Only the area of the mounting plane is increased while the whole sheath 200 is not enlarged, thus, materials are saved, and the cost is reduced.

Concretely, in the embodiment, the hydraulic plate 100 is of a square flat-plate structure, the sleeve part is of a cylindrical structure, an outward flanging of the upper end of the cylindrical structure forms the square mounting plane 201 which is matched with the hydraulic plate, and the square flat-plate structure is fit with the square mounting plane and is fixedly connected with the square mounting plane.

In order to achieve that the support for household appliance, provided by the embodiment, is fixedly mounted at the bottom of the household appliance, concretely, the sheath 200 and the hydraulic plate 100 are fixedly mounted at the bottom of the household appliance through connecting devices, and the hydraulic plate 100 is clamped between the mounting plane 201 of the sheath 200 and a bottom plane of the household appliance.

As a mounting mode of the embodiment, the bottom of the household appliance provided by the embodiment is provided with a bottom plate 700, mounting holes 701 are formed in the bottom plate 700, hydraulic plate holes 102 are formed in the hydraulic plate 100, and sheath holes 203 are formed in the sheath 200. The connecting devices are connecting bolts/connecting screws, and the connecting bolts/connecting screws sequentially penetrate through the sheath holes 203 and the hydraulic plate holes 102 and are fastened to the mounting holes 701. According to the embodiment, the fixed mounting of the sheath 200, the hydraulic plate 100 and the bottom plate 700 of the household appliance is achieved in one time through the connecting bolts/connecting screws, and the mounting is simple and convenient.

Further, the holes of the sheath 200 are uniformly distributed along the circumferential direction of the mounting plane 201, the hydraulic plate holes 102 are uniformly distributed along the circumferential direction of the hydraulic plate 100, and the mounting holes 701 are formed in the bottom plate 700 of the household appliance corresponding to the hydraulic plate holes 102 and the sheath holes 203. Thus, the stability of fixed mounting can be improved.

Preferably, at least two mounting holes 701, at least two hydraulic plate holes 102 and at least two sheath holes 203 are formed. Further, preferably, four mounting holes 701, four hydraulic plate holes 102 and four sheath holes 203 are formed to correspond to the square flat-plate structure and the square mounting plane.

As a mounting mode of the embodiment, the sheath 200 and the hydraulic plate 100 are fixedly connected in a snap-in connection, bonding, hot-melting or welding manner and then are fixedly mounted at the bottom of the household appliance.

According to the embodiment, the hydraulic plate 100 is made of plastics through integral injection molding or made of metal through die-casting, and the sheath is made of plastics through integral injection molding or made of a metallic material through die-casting.

According to stress characteristics of the support for household appliance, provided by the embodiment, preferably, the hydraulic plate 100 is made of plastics through integral injection molding, and the sheath 200 is made of metal through die-casting. Because the sheath 200 is subjected to greater stress, the sheath 200 is made of metal through die-casting to guarantee strength, thus, the support for household appliance, provided by the embodiment, is lower in manufacturing cost, and the overall strength of the support for household appliance is guaranteed.

Partial gravity F1 of the household appliance is applied to the hydraulic plate 100 through the bottom plate 700, stress of a plane of the hydraulic plate 100 is transferred to the mounting plane 201 of the sheath 200, stress of the interior of the hydraulic plate 100 is transferred to the regulating support 300 through hydraulic pressure, the regulating support 300 similarly bears a supporting force F2 from a supporting surface, the F1 is equal to the F2, stress of the regulating support 300 is transferred to the plane of the hydraulic plate 100, and the stress is then transferred to the bottom plate 700 of the household appliance by the hydraulic plate 100. By such a design, although the hydraulic plate 100 bears a pressure force of internal liquid flow passage, a partial gravity force of the washing machine and the supporting force of the regulating support 300, the forces are all transferred to the mounting plane 201 of the sheath 200, the regulating support 300 and the bottom plate 700 of the household appliance.

Embodiment II

Referring to FIG. 6 to FIG. 9, a support for household appliance comprises:

a hydraulic plate 100, which is fixed to the bottom of the household appliance;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber; and the flexible accommodation body 600 extends and retracts to drive the regulating support 300 to axially move in the sheath 200 for leveling under the action of pressure; and the hydraulic plate 100 is locally embedded inside the sheath 200.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

According to the support for household appliance, provided by the embodiment, the household appliance is automatically leveled by using the hydraulic principle, and the leveling is simple and reliable; and as the household appliance (for example, a washing machine) generally generates vibration during working, in order to guarantee the stability of running of the household appliance, the overall height of the support for household appliance, provided by the embodiment, should be lowered as far as possible to lower the center of gravity of the household appliance.

According to the support for household appliance, provided by the embodiment, the hydraulic plate 100 is locally embedded inside the sheath 200, thus, the overall height of the support for household appliance is reduced while the overall strength of the hydraulic plate 100 is guaranteed, and the household appliance can achieve better shock absorption stability. In addition, the hydraulic plate 100 is locally embedded inside the sheath 200, and thus, the sheath 200 also plays a certain role in protecting the hydraulic plate 100.

Concretely, in the embodiment, a bulging embedding part 108 is arranged on one face, facing to the sheath 200, of the hydraulic plate 100 and is embedded inside the sheath 200. According to the embodiment, the embedding part 108 bulges from the hydraulic plate 100, thus, the hydraulic plate 100 has adequate strength, and the stability of flowing of the hydraulic medium in the hydraulic plate 100 is guaranteed; and the embedding part 108 is embedded inside the sheath 200, thus, the thickness of mounting of the hydraulic plate 100 is reduced, the overall height of the support for household appliance is reduced, and the household appliance can have better supporting stability.

Further, in the embodiment, the sheath 200 comprises an internal hollow sleeve part, and one end of the regulating support 300 is sleeved by the sleeve part and the regulating support is axially movable relatively. The upper end of the sleeve part is flanged outward to form the mounting plane 201, and the mounting plane 201 is fit with the bottom face of the hydraulic plate 100 and is fixedly connected with the bottom face of the hydraulic plate 100; and the embedding part 108 is embedded inside a sleeve part. According to the embodiment, the embedding part 108 further has a locating function when the hydraulic plate 100 and the sheath 200 are fixedly connected.

Further, in the embodiment, the hydraulic plate comprises a square plate body, the sleeve part is of a cylindrical structure, an outward flanging of the upper end of the cylindrical structure forms a square mounting plane which is matched with the hydraulic plate, and a square flat-plate structure is fit with the square mounting plane and is fixedly connected with the square mounting plane; and the embedding part 108 is a cylindrical bulge which bulges from the surface of the square plate body, and the cylindrical bulge is embedded inside the cylindrical structure.

According to the embodiment, a mounting structure between the hydraulic plate 100 and the sheath 200 is designed according to structural features of the hydraulic plate 100 and the sheath 200, and the square flat-plate structure is fit with the square mounting plane and is fixedly connected with the square mounting plane, so that the mounting is simple and convenient, and the overall height is reduced. The embedding part 108 is embedded inside the cylindrical structure, and the overall strength of the hydraulic plate 100 is ensured by using an internal space of the cylindrical structure; and the embedding part 108 is designed into the cylindrical bulge and can be matched with the interior of the cylindrical structure to exert a locating function, and the fixed connection between the hydraulic plate 100 and the sheath 200 is better facilitated.

According to the embodiment, the hydraulic medium in the flexible accommodation body 600 flows through the liquid flow passage 107 in the hydraulic plate 100, and the accommodation chamber is formed by the hydraulic plate 100, the sheath 200 and the regulating support 300. Therefore, in order to guarantee that the hydraulic medium in the flexible accommodation body 600 can enter the hydraulic plate 100, a hydraulic plate groove 104 is formed in an end face of a part, embedded inside the sheath, of the hydraulic plate 100; the flexible accommodation body 600 has an opening part, and the opening part of the flexible accommodation body 600 is deformed under pressure of a pressing ring 500 and fills the hydraulic plate groove 104 for sealing. According to the embodiment, the hydraulic plate 100 is partially embedded in the sheath 200, so that the hydraulic medium in the flexible accommodation body 600 can circulate into the liquid flow passage 107 in the hydraulic plate 100 by directly mounting the flexible accommodation body 600 to the embedding part in a sealed manner.

Preferably, the hydraulic plate groove 104 is formed in the end face of the embedding part 108.

According to the embodiment, the embedding part of the hydraulic plate 100 concerns the overall strength of the hydraulic plate 100 and also concerns the sealed mounting of the flexible accommodation body 600, so that the embedding part 108 comprises a first embedding part 108 bulging from a plane of the hydraulic plate and a second embedding part 106 bulging from a plane of the first embedding part 108. The first embedding part 108 is mainly used for enhancing the overall strength of the hydraulic plate 100, and the second embedding part 106 is mainly used for achieving the sealed mounting of the flexible accommodation body 600 to further enhance the overall strength of the hydraulic plate 100.

In order to achieve that the flexible accommodation body 600 is mounted on the hydraulic plate 100 in a sealed manner, the pressing ring 500 comprises a radial projecting part 501, the inner diameter of the radial projecting part 501 is smaller than the outer diameter of the opening part of the flexible accommodation body 600, the pressing ring 500 is fixed to the bottom face of the first embedding part 106, and the opening part of the flexible accommodation body 600 is deformed under pressure of the radial projecting part 501 and fills the hydraulic plate groove 104 for sealing.

Further, the hydraulic plate 100 further comprises liquid outlet nozzles 101, and the liquid flow passage 107 is formed inside the hydraulic plate 100 and communicates with the liquid outlet nozzles 101 and the interior of the flexible accommodation body 600; and the liquid outlet nozzles 101 are arranged in a manner of being lower than an upper plane of the hydraulic plate 100. According to the embodiment, the liquid outlet nozzles 101 are mainly used for being connected with high-pressure pipes, at least two household-appliance-used bottom feet, provided by the embodiment, communicate with one another through the high-pressure pipes, thus, the hydraulic medium can circulate among the household-appliance-used bottom feet, and leveling is carried out based on the hydraulic principle. According to the embodiment, a certain distance H4 is present between the plane of the hydraulic plate and the liquid outlet nozzles 101, thus, the liquid outlet nozzles 101 are lower than or level with the plane of the hydraulic plate after the liquid outlet nozzles 101 are connected with the high-pressure pipes, and the condition that the liquid outlet nozzles 101 are subjected to flexural deformation due to a bottom plate plane of the household appliance after the support for household appliance is fixed to a bottom plate of the household appliance is prevented.

The liquid outlet nozzles 101 are arranged in a manner of bulging from the periphery edge of the hydraulic plate 100, the periphery of the hydraulic plate 100 is mainly mounted in a manner of being fit with the mounting plane 201 of the sheath 200, thus, in order to reduce the overall height, the thickness of the periphery of the hydraulic plate 100 is small. Thus, pipe diameters of the liquid outlet nozzles 101 are very small, however, too small pipe diameters are not only unfavorable to the circulation of the hydraulic medium, but also cause insufficient strength, and fracture is extremely easily caused. According to the embodiment, a projecting base part 109 is further formed on the bottom face of the hydraulic plate 100, and the liquid outlet nozzles 101 are arranged on the base part 109. Thus, in view of the requirements of the liquid outlet nozzles 101 on structural strength, local reinforced base parts 109 are designed for the hydraulic plate 100, thus, the pipe diameters of the liquid outlet nozzles 101 can be enlarged, and the fracture of the liquid outlet nozzles 101 is avoided.

Preferably, the projecting base part 109 and the embedding part are arranged in a same level and are interconnected. According to the embodiment, the liquid flow passage 107 inside the hydraulic plate 100 is arranged at the embedding part, and the influence on the flowing of the hydraulic medium in the a liquid flow passage 107 caused by outside pressure is avoided due to greater thickness of the embedding part, so that by arranging the base parts 109 and the embedding part in a same level, the liquid flow passage 107 can horizontally extend to the liquid outlet nozzles 101, and the stable circulation of the hydraulic medium is ensured.

Further, in view of a structure of the sheath 200, the upper end part of the sheath 200 is flanged to form the mounting plane 201, so that liquid nozzle outlets 206 which are used for the yielding mounting of the liquid outlet nozzles 101 are formed in the sheath 200. Thus, the liquid outlet nozzles 101 can be mounted in a non-interference manner.

Preferably, openings which communicating with each other are correspondingly formed in the mounting plane 201 and the sleeve part respectively to form the liquid nozzle outlets 206, and the base part 109 is embedded in the liquid nozzle outlets for the yielding mounting of the liquid outlet nozzles 101.

Figure 8:
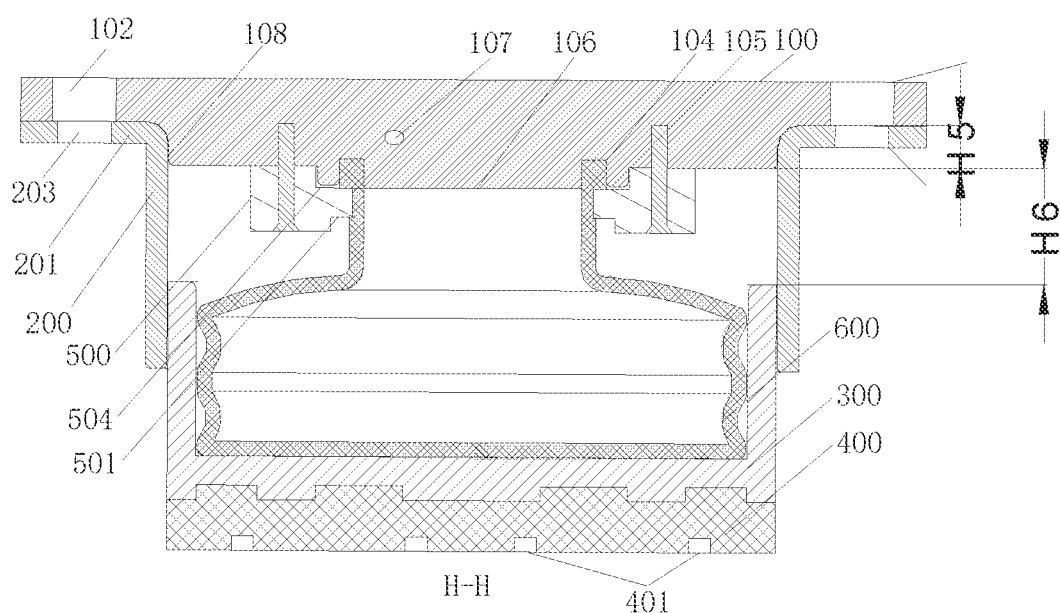
FIG. 8 is a sectional view of the support for household appliance of embodiment II of the present disclosure along a plane H-H in the FIG. 7.
Figure 9:
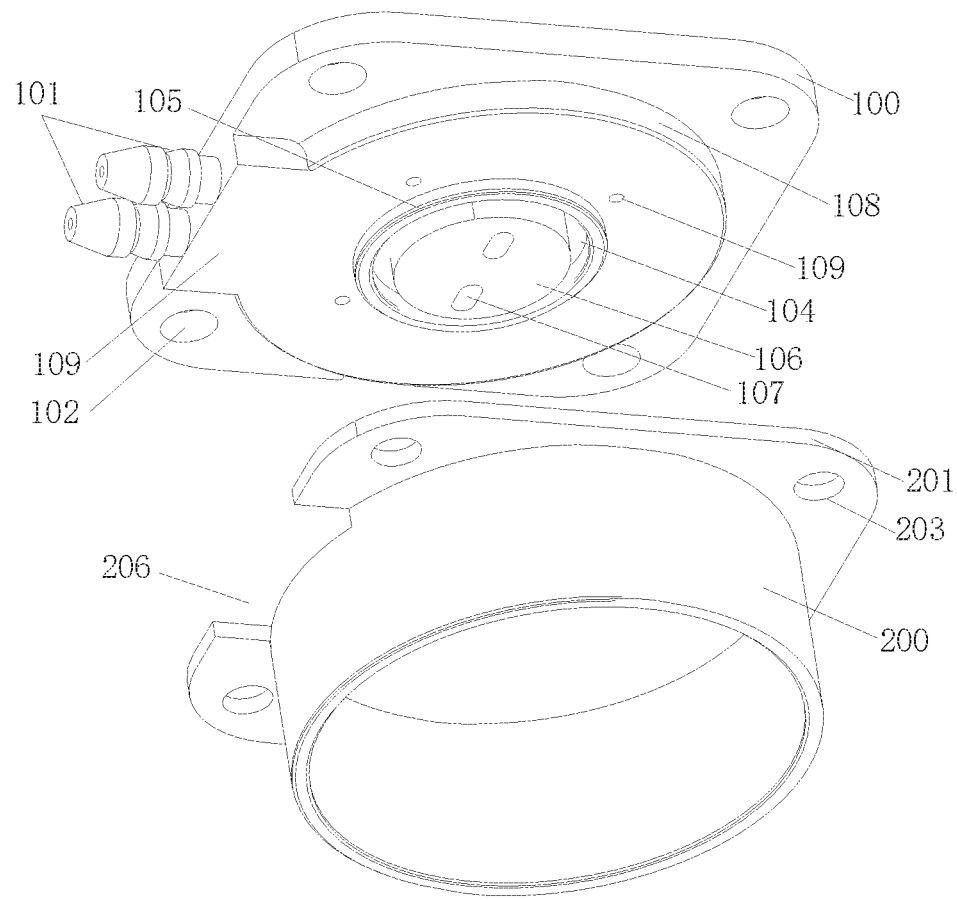
FIG. 9 is a local exploded view of the support for household appliance of embodiment II of the present disclosure.
Figure 10:
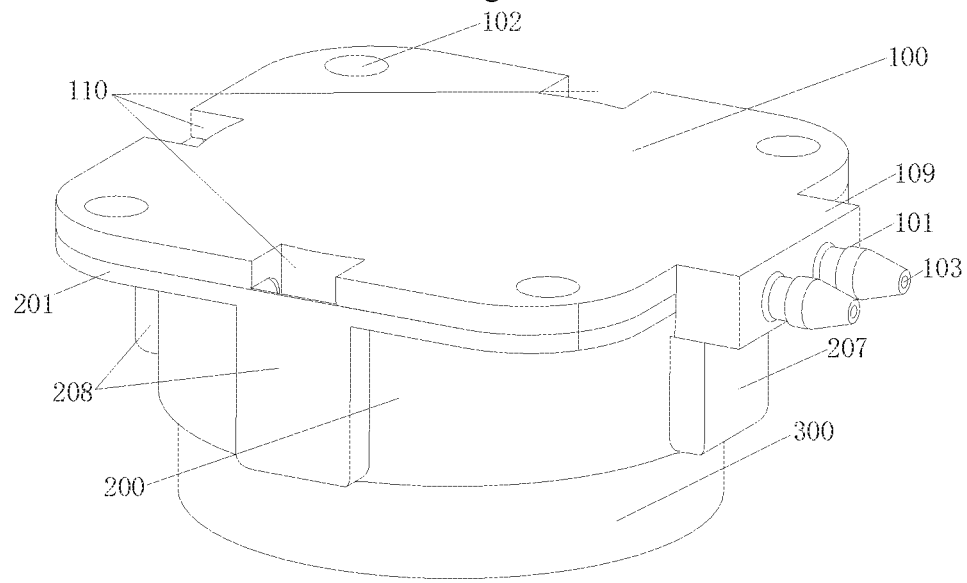
FIG. 10 is a three-dimensional structural schematic diagram of a support for household appliance of embodiment III of the present disclosure.
Figure 11:
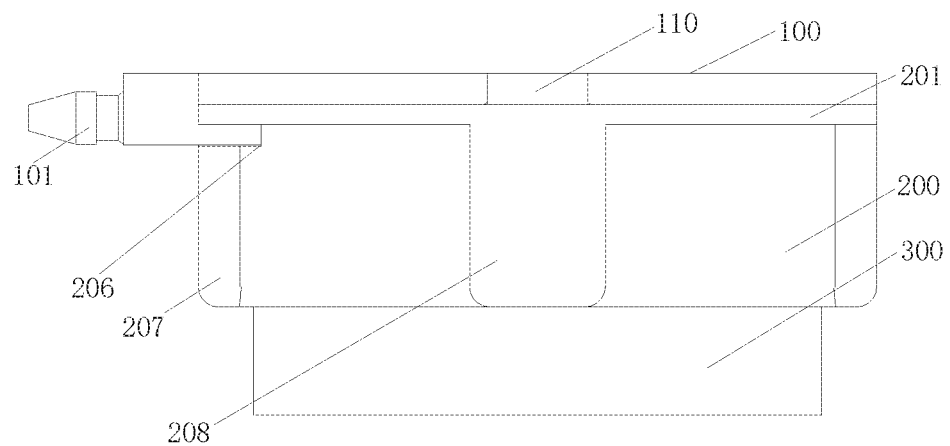
FIG. 11 is a front view of the support for household appliance of embodiment III of the present disclosure.
Figure 12:
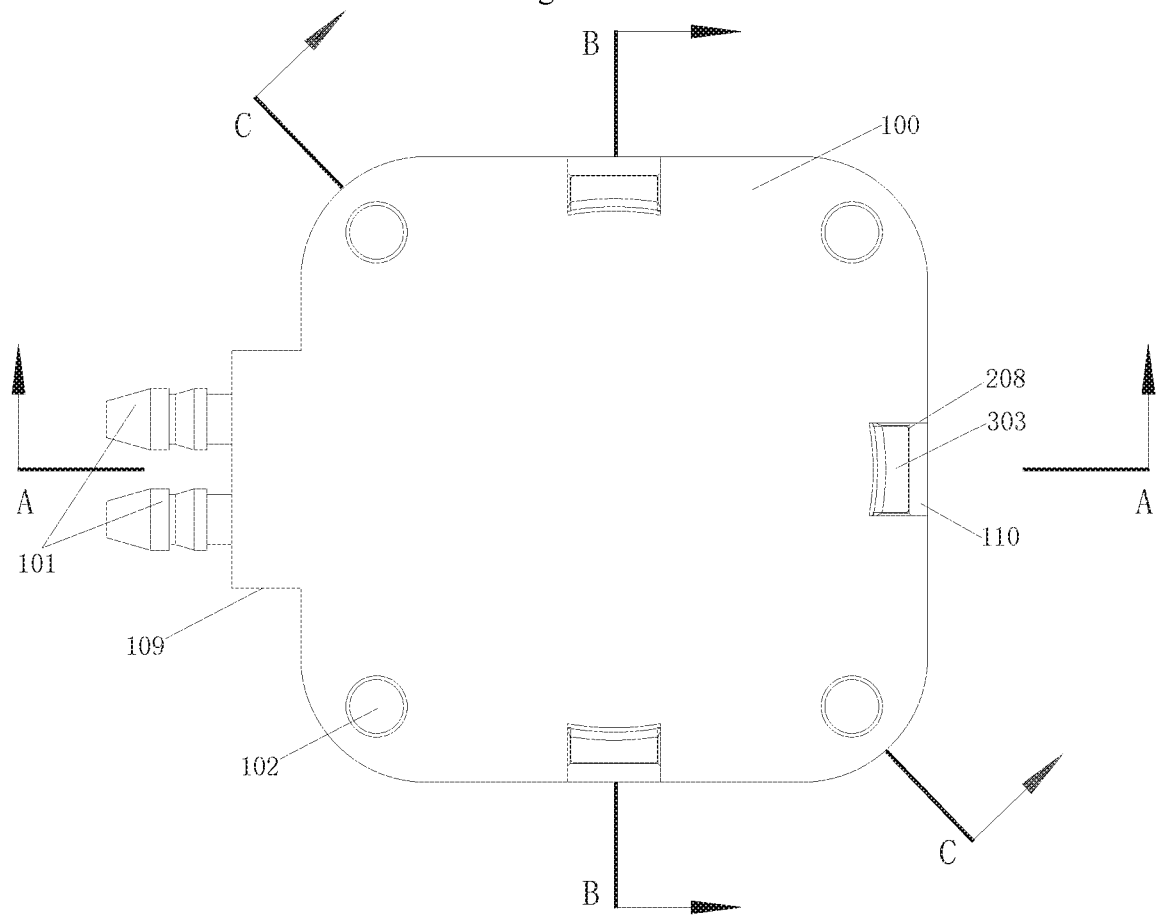
FIG. 12 is a top view of a support for household appliance of an embodiment III of the present disclosure.
Figure 13:
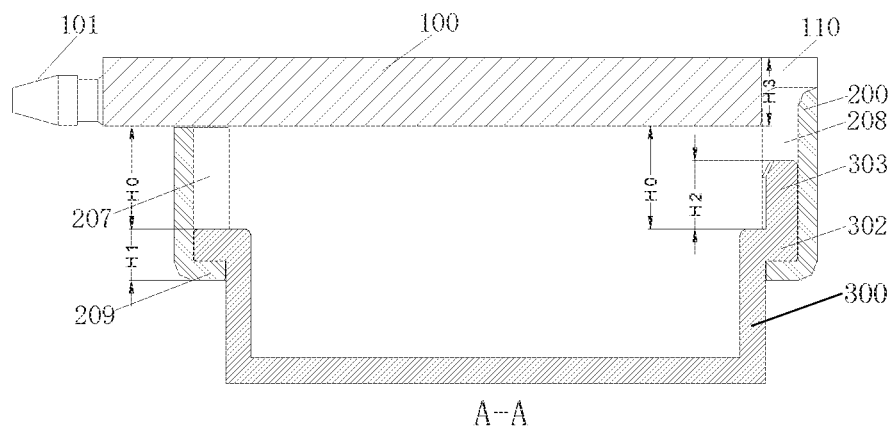
FIG. 13 is a sectional view of the support for household appliance of embodiment III of the present disclosure along a plane A-A in the FIG. 12.
Figure 14:
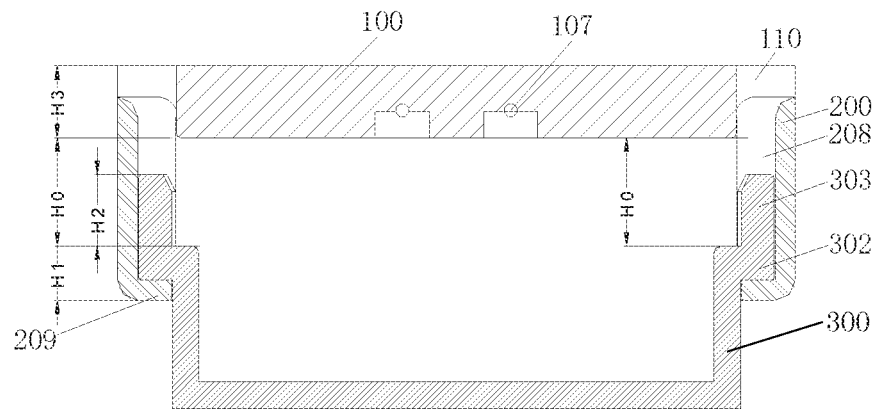
FIG. 14 is a sectional view of the support for household appliance of embodiment III of the present disclosure along a plane B-B in the FIG. 12.
Figure 15:
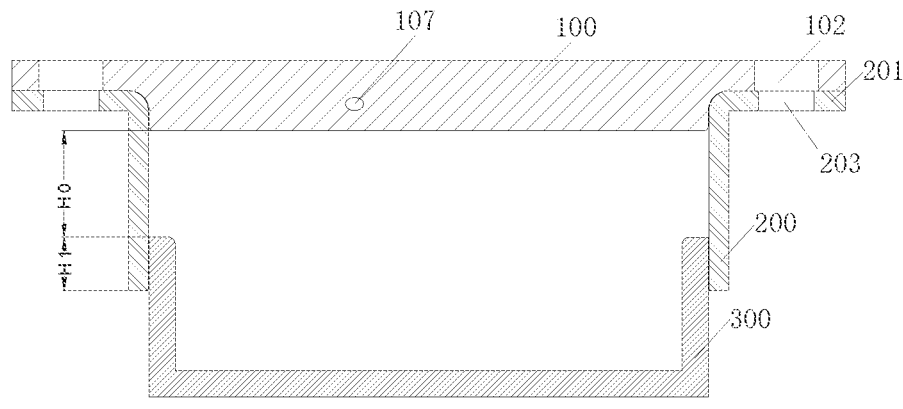
FIG. 15 is a sectional view of the support for household appliance of embodiment III of the present disclosure along a plane C-C in the FIG. 12.

According to the embodiment, the hydraulic plate 100 has the embedding part and is partially embedded to the sheath 200 by a certain distance, i.e., H5 shown in FIG. 8, so that the embedding part is protected by an inner-tube structure of the sheath 200, the reliability is improved, the height of the entire structure is reduced, and meanwhile, the shock absorption performance is further improved.

Due to a partial embedded design of the hydraulic plate 100, positions of the liquid outlet nozzles 101 are lowered; yielding ports are formed in the sheath 200 corresponding to the positions of the liquid outlet nozzles 101, so that the liquid outlet nozzles 101 can stretch out without interference; and the base part 109 which is used for exerting a strengthening action are designed at connections of the liquid outlet nozzles 101 and the hydraulic plate 100.

Embodiment III

Referring to FIG. 10 to FIG. 15, a support for household appliance comprises:
a hydraulic plate 100;
a sheath 200, which is fixedly connected with the hydraulic plate 100;
a regulating support 300, which is arranged in the sheath 200 and is axially movable relative to the sheath 200;
an accommodation chamber, which is formed by the hydraulic plate 100, the sheath 200 and the regulating support 300; and
a flexible accommodation body 600, which accommodates a liquid medium and is arranged in the accommodation chamber;
the flexible accommodation body 600 extends and retracts to drive the regulating support 300 to axially move in the sheath 200 for leveling under the action of pressure; and
the sheath 200 and/or the regulating support 300 are/is provided with a guiding limiting mechanism which is used for limiting the circumferential rotation of the regulating support 300 relative to the sheath 200, and a yielding part corresponding to the guiding limiting mechanism is formed in the hydraulic plate 100.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

According to the support for household appliance, provided by the embodiment, the household appliance is automatically leveled by using the hydraulic principle, and the leveling is simple and reliable. The regulating support 300 is arranged in the sheath 200 in a manner of being capable of axially moving relative to the sheath 200, and the regulation on the household appliance is only limited to a vertical direction, so that in order to guarantee the stability of leveling, the rotation of the regulating support 300 relative to the sheath 200 is required to be limited. Therefore, the guiding limiting mechanism is used for limiting the regulating support 300 to move along a required direction relative to the sheath 200.

As the household appliance (for example, a washing machine) generally will generate vibration during working, in order to guarantee the stability of running of the household appliance, the overall height of the support for household appliance, provided by the embodiment, should be lowered as far as possible to lower the center of gravity of the household appliance. Therefore, the yielding part is formed in the hydraulic plate 100 corresponding to the guiding limiting mechanism, the axial moving of the regulating support 300 is not affected while the guiding limiting mechanism is arranged, the overall height of the support for household appliance is lowered, and the stability of shock absorption of the support for household appliance is improved. Concretely, the guiding limiting mechanism comprises a guiding limiting groove/guiding limiting convex portion arranged on the internal wall of the sheath and guiding limiting convex portion/guiding limiting groove correspondingly arranged on the external wall of the regulating support. The guiding limiting convex portions are arranged in the guiding limiting grooves in a relative slidable manner to limit the circumferential rotation of the regulating support relative to the sheath. According to the embodiment, the axial moving of the regulating support 300 is guided through matching between the guiding limiting grooves and the guiding limiting convex portions, and thus, the structure is simple and reliable.

According to the embodiment, the yielding part is provided corresponding to the guiding limiting convex portion/ guiding limiting groove of the regulating support 300, the regulating support 300 moves towards the hydraulic plate 100, and one end of each guiding limiting convex portion/ guiding limiting groove of the regulating support 300 enters one corresponding yielding part. According to the embodiment, in view of the axial moving of the regulating support 300, only the yielding part is required to be arranged corresponding to the guiding limiting convex portion/guiding limiting groove of the regulating support 300 regardless of the type of the guiding limiting mechanism, so that on the premise of not changing regulating height, the overall height of the support for household appliance is lowered, and the stability of guiding and limiting is guaranteed.

As a preferred implementation mode of the embodiment, guiding limiting groove 202 is provided in the internal wall of the sheath 200 along an axial direction of the sheath 200, guiding limiting convex portion 301 is arranged on the external wall of the regulating support 300 and the guiding limiting convex portion 301 is arranged in the guiding limiting groove 202 in a relative slidable manner to limit the circumferential rotation of the regulating support 300 relative to the sheath 200.

According to the embodiment, the yielding part is a passage 110 formed in the hydraulic plate 100 corresponding to the guiding limiting convex portion 301, the regulating support 300 axially moves up and down in the sheath 200, and one end of each guiding limiting convex portion 301 goes into/out of one corresponding passage 110.

Therefore, according to the support for household appliance, provided by the embodiment, one end of each guiding limiting convex portion 301 goes into/out of one corresponding passage, so that a greater regulating height is present under the condition of the same overall height; and under the condition of the same regulating height, the support for household appliance, provided by the embodiment, can have a smaller overall height.

As a preferred implementation mode of the embodiment, each guiding limiting convex portion 301 comprises a first guiding limiting block 302 and a second guiding limiting block 303. The first guiding limiting block 302 is fixed to the external wall of the regulating support 300, and the second guiding limiting block 303 is fixed to the first guiding limiting blocks 302 and extends by a certain height towards the hydraulic plate 100. According to the embodiment, the first guiding limiting block 302 mainly plays a role in carrying out guiding and limiting in the guiding limiting groove 202, the second guiding limiting block 303 prolongs the first guiding limiting block 302, and thus, the stability of guiding and limiting is better.

According to the embodiment, the passage 110 is formed corresponding to the second guiding limiting block 303, the regulating support 300 axially moves up and down in the sheath 200, and the second guiding limiting block 303 goes into/out of the passage 110. Thus, the stability of guiding and limiting is improved on the premise of not increasing the overall height of the support for household appliance.

Further, the height of the second guiding limiting block 303 is smaller than or equal to the thickness of the hydraulic plate 100. Thus, the second guiding limiting block 303 will not stretch out of the upper part of the hydraulic plate 100 and affect the axial moving of the regulating support 300 when the second guiding limiting block 303 goes in/out of the passage 110.

As a preferred implementation mode of the embodiment, a plurality of guiding limiting mechanisms are provided and are separately distributed along circumferential direction of the sheath 200 and/or the regulating support 300, and a plurality of yielding parts are provided in the hydraulic plate 100 corresponding to the guiding limiting mechanisms. By arranging several guiding limiting mechanisms, the stability of limiting is further improved, and the effect of guiding and limiting is better.

Preferably, a plurality of guiding limiting grooves 202 are distributed in the internal wall of the sheath 200 along a circumferential direction, a plurality of guiding limiting convex portions 301 are formed on the external wall of the regulating support 300 corresponding to the guiding limiting grooves 202, and a plurality of yielding parts are formed on the hydraulic plate 100 corresponding to the guiding limiting convex portions 301.

Concretely, in view of a concrete structure of the hydraulic plate 100 and a concrete structure of the sheath 200 and in the present embodiment, the hydraulic plate 100 comprises a plate-type body, a base part 109 bulging from the bottom face of the plate-type body and liquid outlet nozzles 101 arranged on the base parts 109. According to the embodiment, a first guiding limiting groove 208 corresponding to the plate-type body and a second guiding limiting groove 207 corresponding to the base part 109 are formed in the internal wall of the sheath 200, and first guiding limiting convex portion matches with the first guiding limiting groove 208 and second guiding limiting convex portion matches with the second guiding limiting groove are formed on the external wall of the regulating support 300.

The yielding part is arranged on the hydraulic plate 100 corresponding to the first guiding limiting convex portion, the regulating support 300 moves towards the hydraulic plate 100, and one end of each first guiding limiting convex portion enters one corresponding yielding part.

The liquid outlet nozzle 101 communicates with the liquid flow passage, so that in order to guarantee the stability of flowing of the hydraulic medium, yielding part is not formed on the hydraulic plate 100 corresponding to the liquid outlet nozzle 101 anymore.

Concretely, the first guiding limiting convex portion comprises a first guiding limiting block 302 bulging from the external wall of the regulating support 300; and the second guiding limiting convex portion comprises a first guiding limiting block 302 bulging from the external wall of the regulating support 300 and a second guiding limiting block 303 which is fixed to the first guiding limiting blocks 302 and extends towards the hydraulic plate by a certain height.

According to the embodiment, the sheath 200 comprises an internal hollow sleeve part, and one end of the regulating support 300 is sleeved by the sleeve part and is axially movable relatively; the upper end of the sleeve part is flanged outward to form the mounting plane 201, and the mounting plane 201 is fit with the bottom face of the plate-type body and is fixedly connected with the bottom face of the plate-type body; and the circumferential wall of the sleeve part outwards bulges to form a guiding limiting groove which is a same level with the mounting plane.

According to the embodiment, in order to achieve the up and down movement of the regulating support 300 in the sheath 200 and prevent circumferential rotation, a certain quantity of guiding limiting grooves 202 are formed in the circumference of the sheath 200, and the quantity is N which is greater than or equal to 1. In a graphic illustration of the present disclosure, N is 4 preferably.

Corresponding guiding limiting convex portion 301 is arranged on the circumference of the regulating support 300, and the quantity of the guiding limiting convex portions is N which is greater than or equal to 1. In a graphic illustration of the present disclosure, N is 4 preferably. The guiding limiting convex portion 301 can move in the guiding limiting groove and is limited by a stopping part 209 of bottom of the guiding limiting groove 202 to prevent the regulating support 300 from falling off from the sheath 200.

In order to reduce the height of the support for household appliance as far as possible and achieve better stability, the height of the sheath 200 and the height of the regulating support 300 can be reduced as far as possible in principle, particularly the height of a superposed part, i.e., H1 in a graphic illustration under the condition of not lowering a regulating height H0. When H1 is very small, the limiting action of the sheath 200 to the regulating support 300 will be lowered, and the problem such as biasing of the regulating support 300 is caused.

According to the embodiment, the passage 110 is ingeniously formed in the hydraulic plate 100 corresponding to the guiding limiting groove 202, each guiding limiting convex portion 301 comprises a first guiding limiting block 302 and a second guiding limiting block 303. The height of the second guiding limiting block 303 H2 is higher than the circumferential face of the first guiding limiting block 302, and the inner diameter of the second guiding limiting block 303 is greater than outer diameter of the regulating support 300. The second guiding limiting block 303 of the regulating support 300 is further limited in the guiding limiting groove 202 of the sheath 200, and the action of no biasing and stability can be achieved even if the superposed H1 is very small. The circumferential face of the first guiding limiting block 302 is in contact with the hydraulic plate 100 to achieve a movement distance H0; at this time, the second guiding limiting block 303 will not shorten a movement distance, and the second guiding limiting block 303 can further enter the passage 110 of the hydraulic plate 100 as the hydraulic plate has the thickness of H3; and preferably, the height H2 of the guiding limiting bulges is smaller than or equal to the H3.

Embodiment IV

Referring to FIG. 1 to FIG. 3 and FIG. 16 to FIG. 24, a support for household appliance comprises:

a hydraulic plate 100, which is internally provided with a liquid flow passage 107;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber;

the flexible accommodation body 600 extends and retracts to drive the regulating support 300 to axially move in the sheath 200 for leveling under the action of pressure; and the flexible accommodation body 600 has an opening part 601, and the opening part 601 is mounted on the hydraulic plate 100 in a sealed manner and communicates with the a liquid flow passage 107.

According to the support for household appliance, provided by this embodiment, based on the hydraulic principle, the support can perform adaptive regulation automatically by means of the fluidity of a hydraulic medium for different pressures resulting from unflatness, the hydraulic medium stops circulating until the support for household appliance achieves balance, and thus, automatic leveling is achieved.

The stability of flowing of liquid is a key for achieving the leveling of the support for household appliance, provided by the embodiment, the opening part 601 of the flexible accommodation body 600 is mounted on the hydraulic plate 100 in a sealed manner, the hydraulic medium in the flexible accommodation body 600 can circulate into the a liquid flow passage 107 and flow to liquid outlet nozzles 101 through the a liquid flow passage 107, and thus, the hydraulic medium can circulate among the household-appliance-used bottom feet for automatic leveling.

As a preferred implementation mode of the embodiment, in the embodiment, the opening part 601 of the flexible accommodation body 600 is fixedly mounted on the bottom face of the hydraulic plate 100 through the pressing ring 500, and the opening part is deformed under joint pressure of the pressing ring 500 and the hydraulic plate 100 for sealing. According to the embodiment, the opening part is deformed under pressure of the pressing ring 500 for sealing, so that the sealing is simpler and more convenient, and the sealing effect is good.

Further, the flexible accommodation body 600 comprises a small-diameter part 603, the end part of the small-diameter part 603 is flanged to form the opening part 601, the pressing ring 500 sleeves on the small-diameter part 603, and the opening part 601 is deformed under joint pressure of the pressing ring 500 and the hydraulic plate 100 for sealing. According to the embodiment, during the sealed mounting of the flexible accommodation body 600, the small-diameter part 603 can be firstly nested in the pressing ring 500, only the pressing ring 500 is required to be fixedly mounted, the pressing ring 500 presses the opening part 601 during fastening, and thus, the sealed mounting is achieved.

Figure 16:
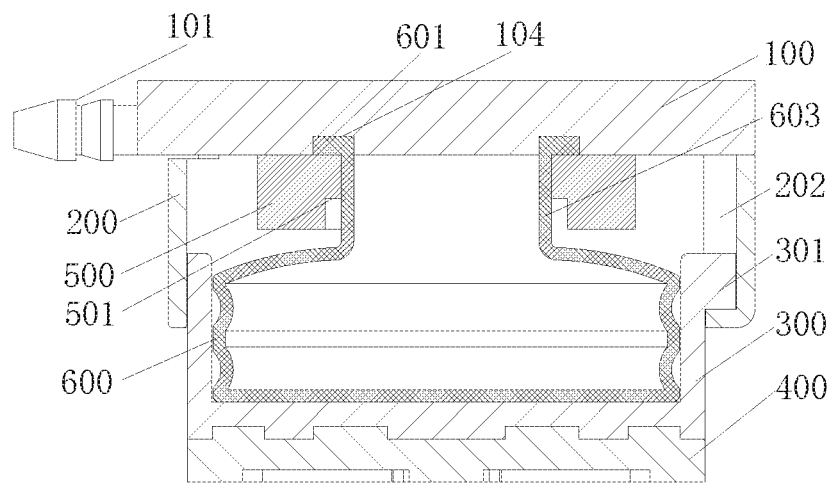
FIG. 16 is a sectional view of an implementation mode of a support for household appliance of embodiment IV of the present disclosure.

Referring to FIG. 16, as an implementation mode of the embodiment, a hydraulic plate groove 104 is formed in the bottom face of the hydraulic plate 100, and the opening part 601 of the flexible accommodation body 600 is deformed under pressure of the pressing ring 500 and fills the hydraulic plate groove 104 for sealing. In this mode, sealing can be achieved through fastening the pressing ring 500 and pressing the opening part 601 of the flexible accommodation body 600 to deform and fill the hydraulic plate groove 104, the structure is simple, and the sealing is reliable and effective.

Preferably, a volume enclosed by the hydraulic plate groove 104 and the pressing ring 500 is smaller than the volume of the opening part 601 of the flexible accommodation body 600. Thus, the opening part 601 of the flexible accommodation body 600 can be in tight contact with the hydraulic plate groove 104 to ensure sealing performance.

Further, the pressing ring 500 comprises a radial projecting part 501, the inner diameter of the radial projecting part 501 is smaller than the outer diameter of the opening part 601 of the flexible accommodation body 600, the pressing ring 500 is fixed to the bottom face of the hydraulic plate 100, and the opening part 601 of the flexible accommodation body 600 is deformed under pressure of the radial projecting part 501 and fills the hydraulic plate groove 104 for sealing. The radial projecting part 501 is used for firstly limiting and sticking the opening part 601 of the flexible accommodation body 600 to facilitate locating and mounting, through fastening the pressing ring 500, the opening part 601 is deformed under pressure of the radial projecting part 501, and the opening part 601 enters the hydraulic plate groove 104 for sealing.

Preferably, the inner diameter of the radial projecting part 501 is greater than the outer diameter of the small-diameter part 603 of the flexible accommodation body 600, the radial projecting part 501 of the pressing ring 500 sleeves on the small-diameter part 603 and limits the opening part 601 to the end part of the pressing ring 500, and the opening part 601 of the flexible accommodation body 600 is deformed under pressure of the radial projecting part 501 and fills the hydraulic plate groove 104 for sealing.

Figure 17:
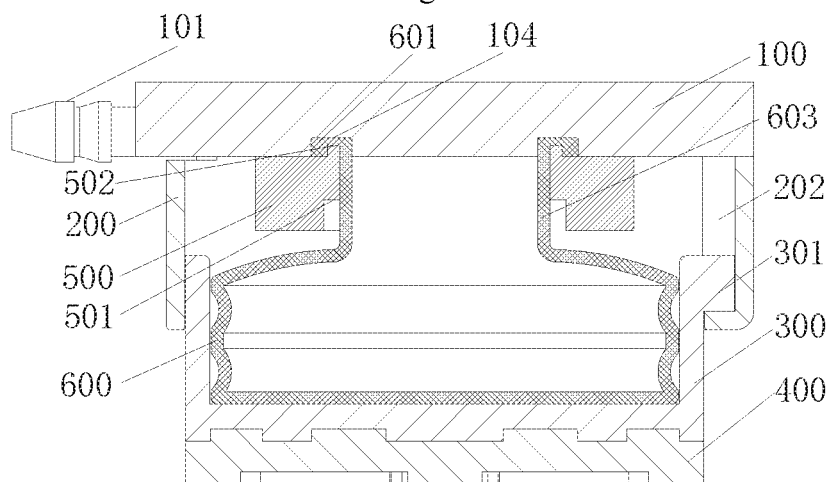
FIG. 17 is a sectional view of another implementation mode of the support for household appliance of embodiment IV of the present disclosure.

Referring to FIG. 17, as another implementation mode of the embodiment, the pressing ring 500 comprises an axial projecting part 502 which is arranged at the end part and bulges along an axial direction, the pressing ring 500 is fixed to the bottom face of the hydraulic plate 100, and the opening part 601 of the flexible accommodation body 600 is deformed under pressure of the axial projecting part 502 and fills the hydraulic plate groove 104 for sealing. According to the embodiment, the axial projecting part 502 extends into the hydraulic plate groove 104 when the pressing ring 500 is fixed to the bottom face of the hydraulic plate 100, the axial projecting part 502 further presses the opening part 601 of the flexible accommodation body 600 to be in close contact with the hydraulic plate groove 104, and thus, the sealing performance is enhanced.

Figure 18:
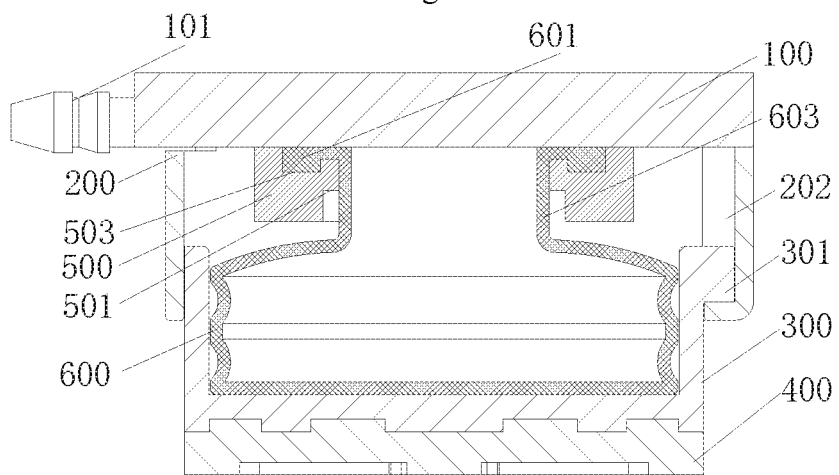
FIG. 18 is a sectional view of another implementation mode of the support for household appliance of embodiment IV of the present disclosure.

Referring to FIG. 18, as another implementation mode of the embodiment, the opening part 601 of the flexible accommodation body 600 is fixedly mounted on the bottom face of the hydraulic plate 100 through the pressing ring 500, a pressing ring groove 503 is formed in the upper end of the pressing ring 500, and the opening part is deformed under joint pressure of the pressing ring 500 and the hydraulic plate 100 and fills the pressing ring groove 503 for sealing. Thus, the bottom face of the hydraulic plate 100 can be simply arranged as a planar structure, the bottom face of the hydraulic plate 100 presses the opening part 601 of the flexible accommodation body 600 to deform through fastening the pressing ring 500, and thus, the opening part enters the pressing ring groove 503 for sealing.

Preferably, a volume enclosed by the hydraulic plate 100 and the pressing ring groove 503 is smaller than the volume of the opening part of the flexible accommodation body. Thus, the opening part 601 of the flexible accommodation body 600 is in tight contact with the pressing ring groove 503 to ensure sealing performance.

Figure 19:
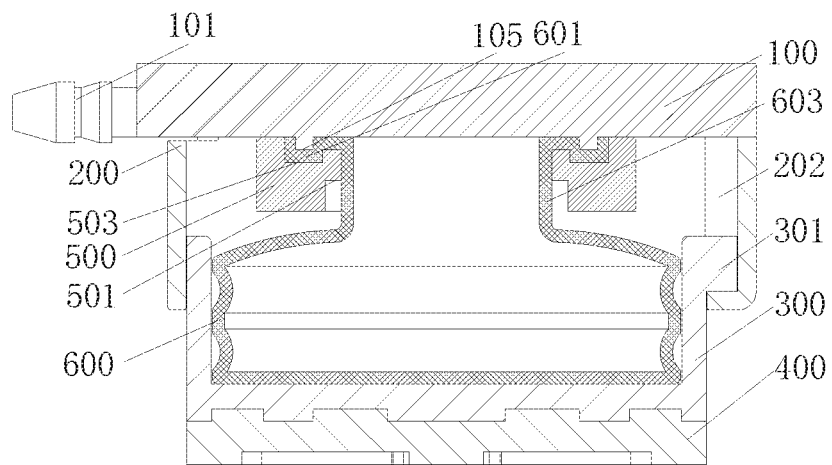
FIG. 19 is a sectional view of another implementation mode of the support for household appliance of embodiment IV of the present disclosure.

Referring to FIG. 19, as another implementation mode of the embodiment, a projecting annular bulge 105 is formed on the bottom face of the hydraulic plate 100, the pressing ring 500 is fixed to the bottom face of the hydraulic plate 100, and the opening part 601 of the flexible accommodation body 600 is deformed under pressure of the annular bulge 105 and fills the pressing ring groove 503 for sealing. According to the embodiment, the annular bulge 105 extends into the pressing ring groove 503 when the pressing ring 500 is fixed to the bottom face of the hydraulic plate 100, the annular bulge 105 further presses the opening part 601 of the flexible accommodation body 600 to be in close contact with the pressing ring groove 503, and thus, the sealing performance is enhanced.

Figure 20:
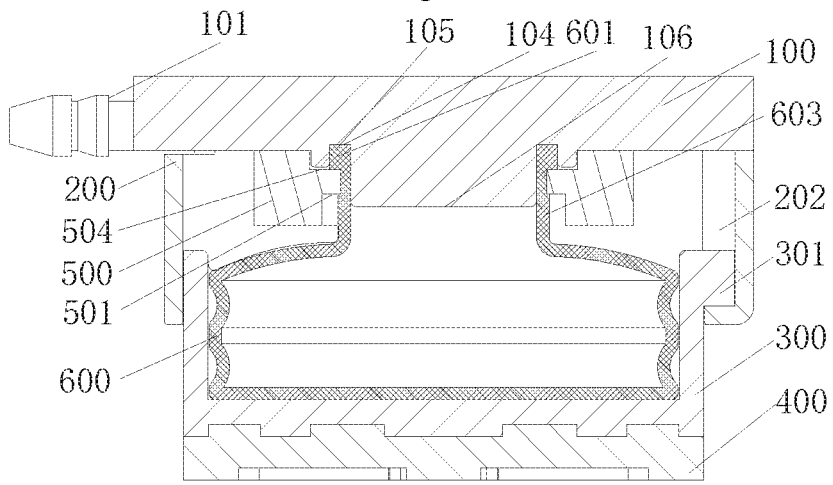
FIG. 20 is a sectional view of another implementation mode of the support for household appliance of embodiment IV of the present disclosure.

Referring to FIG. 20, as another implementation mode of the embodiment, an annular groove 504 is formed in the pressing ring 500, the opening part 601 of the flexible accommodation body 600 passes through the pressing ring 500 and is stuck in the annular groove 504, and the hydraulic plate groove 104 corresponding to the annular groove 504 is formed in the bottom face of the hydraulic plate 100. The opening part 601 of the flexible accommodation body 600 is fastened to the hydraulic plate 100 through the pressing ring 500, and the opening part 601 of the flexible accommodation body 600 is deformed and fills the annular groove 504 and the hydraulic plate groove 104 by a fastening force in a vertical direction to form a transverse seal.

The annular bulge 105 which is located at an outer ring of the hydraulic plate groove 104 is formed on the bottom face of the hydraulic plate 100, a central convex column 106 which is located within the circle of the hydraulic plate groove 104 is arranged on the bottom face of the hydraulic plate 100, and the diameter of the central convex column 106 is greater than the outside diameter of the opening part 601 of the flexible accommodation body 600. The annular bulge 105 enters the hydraulic plate groove 104 and presses the opening part 601 of the flexible accommodation body 600 in a transverse direction together with the central convex column 106 to form a vertical seal.

According to the embodiment, the connection between the flexible accommodation body 600 and the hydraulic plate 100 achieves the transverse seal and the vertical seal, and the higher the borne pressure is, the better the press sealing effect is, so that leakage of the hydraulic medium is prevented, and stability of leveling of the support for household appliance is ensured.

Figure 21:
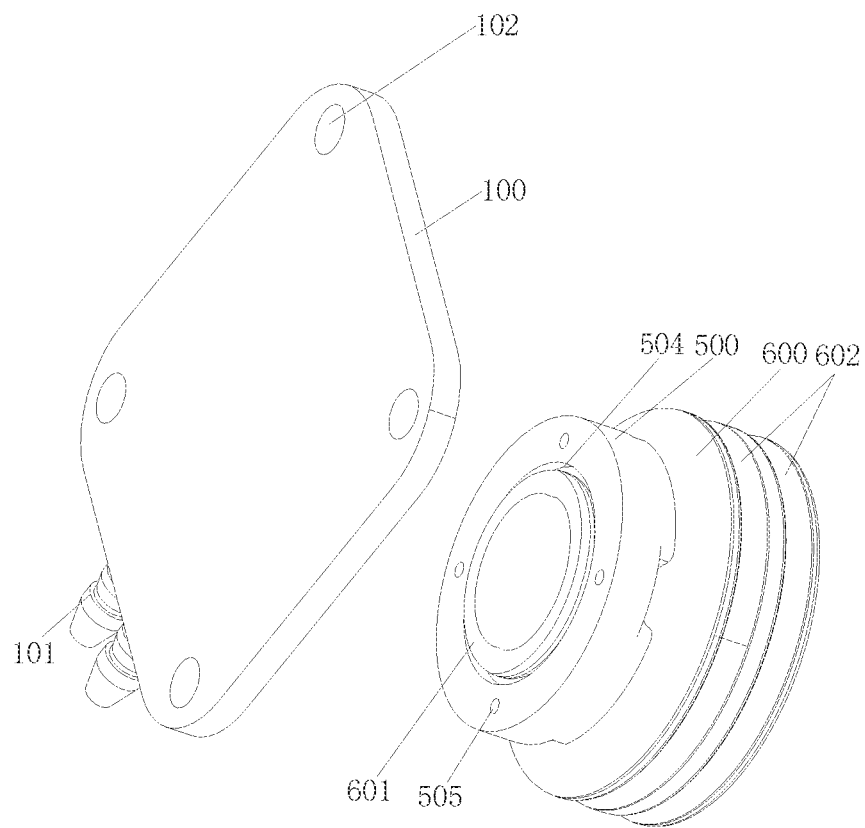
FIG. 21 is a local exploded view of the support for household appliance of embodiment IV of the present disclosure.
Figure 22:
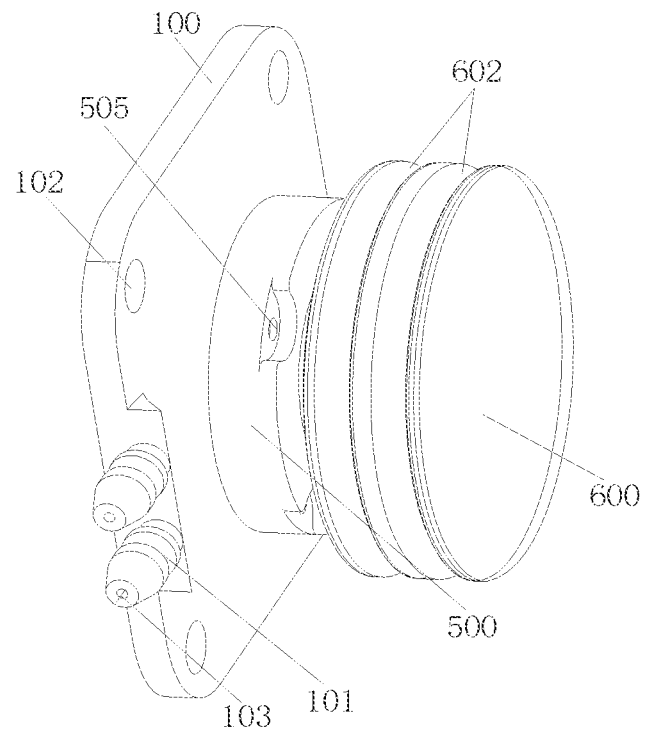
FIG. 22 is a partial assembly drawing of the support for household appliance of embodiment IV of the present disclosure.

Referring to FIG. 21 and FIG. 22, the pressing ring 500 is fixed to the hydraulic plate 100 through a fixing device, specifically the pressing ring 500 and the hydraulic plate 100 is fixedly connected through bolts/screws. Pressing ring mounting holes 505 are formed in the pressing ring 500, and the bolts/screws are fastened to the hydraulic plate 100 through the pressing ring mounting holes 505.

Figure 23:
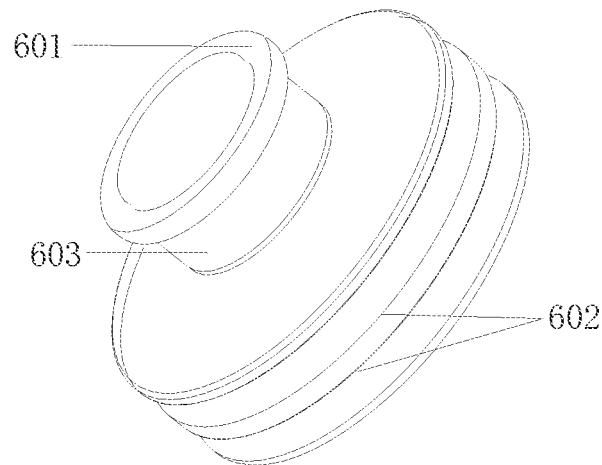
FIG. 23 is a three-dimensional structural schematic diagram I of a flexible accommodation body of the support for household appliance of embodiment IV of the present disclosure.
Figure 24:
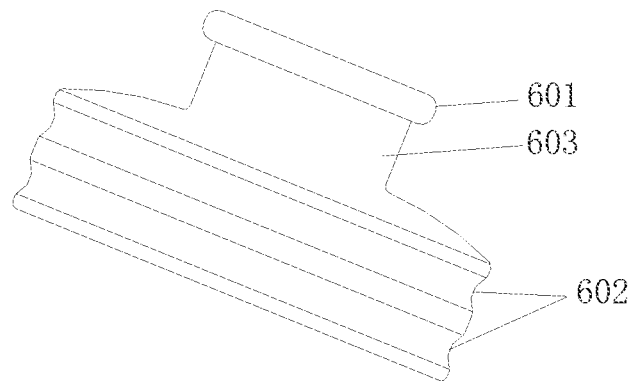
FIG. 24 is a three-dimensional structural schematic diagram II of the flexible accommodation body of the support for household appliance of embodiment IV of the present disclosure.

According to the embodiment, the flexible accommodation body 600 has a structure shown in FIG. 23 and FIG. 24 and comprises an accommodating body 602. The accommodating body 602 is of a soft capsular structure and has a telescopic corrugation structure, and the corrugation structure of the accommodating body 602 is arranged in the regulating support 300 and extends and retracts along with the flowing of the liquid medium to drive the regulating support 300 to axially move in the sheath 200 for leveling.

Referring to FIG. 23, the opening part 601 of the flexible accommodation body 600 is of an O ring shape.

Referring to FIG. 24, the opening part 601 of the flexible accommodation body 600 is of a rectangular shape, and of course, rectangular sides can be subjected to round-off treatment, so that the volume of the opening is effectively increased, and the sealing effect is effectively improved.

Embodiment V

Referring to FIG. 1 to FIG. 3 and FIG. 25 to FIG. 28, a support for household appliance comprises:

a hydraulic plate 100, which is internally provided with a liquid flow passage 107;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber;

the flexible accommodation body 600 extends and retracts to drive the regulating support 300 to axially move in the sheath 200 for leveling under the action of pressure; and the flexible accommodation body 600 has an opening part 601, and the opening part 601 is mounted on the hydraulic plate 100 through the sheath 200 in a sealed manner and communicates with the a liquid flow passage 107.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

The stability of flowing of liquid is a key for achieving the leveling of the support for household appliance, provided by the embodiment, the opening part 601 of the flexible accommodation body 600 is mounted on the hydraulic plate 100 in a sealed manner while the opening part 601 is fixedly mounted by using the sheath 200; the hydraulic medium in the flexible accommodation body 600 circulates into the liquid flow passage 107 and flows to liquid outlet nozzles 101 through the liquid flow passage 107, and thus, the hydraulic medium can circulate among the household-appliance-used bottom feet for automatic leveling. Therefore, according to the support for household appliance, provided by the embodiment, a sealed mounting structure of the flexible accommodation body 600 is greatly simplified, and the sealing effect is better.

Further, the upper end of the sheath 200 is fixedly connected with the hydraulic plate 100 and tightly presses the opening part 601 of the flexible accommodation body 600 onto the hydraulic plate 100 for sealed connection. According to the embodiment, in accordance with the structural feature that the sheath 200 is fixedly connected with the hydraulic plate 100, sealing between the sheath 200 and the hydraulic plate 100 is achieved by directly mounting the opening part 601 of the flexible accommodation body 600 on the sheath 200 in a sealing manner, and the sealed mounting of the flexible accommodation body 600 is achieved while the sheath 200 and the hydraulic plate 100 are fixedly connected, so that not only is the structure simplified, but also the operation is simpler and more convenient.

Still further, the upper end of the sheath 200 is flanged to form a mounting plane 201, the mounting plane 201 is fit with the bottom face of the hydraulic plate 100 and is in fastened connection with the bottom face of the hydraulic plate 100 through the connecting device, and the opening part 601 of the flexible accommodation body 600 is tightly pressed to the mounting plane 201 and the bottom face of the hydraulic plate 100 for sealed connection. According to the embodiment, the mounting plane 201 is fit with the bottom face of the hydraulic plate 100, so that not only is the overall height reduced, but also the press sealing of the opening part 601 of the flexible accommodation body 600 is facilitated.

Concretely, the flexible accommodation body comprises an accommodating body 602, a chamber which is used for accommodating the liquid medium is formed inside the accommodating body 602, an opening end of the accommodating body 602 outwards extends to form the opening part 601; and the accommodating body 602 is arranged in the accommodation chamber, and the opening part 601 extends into a connection of the sheath 200 and the hydraulic plate 100 and is tightly sealed.

Figure 25:
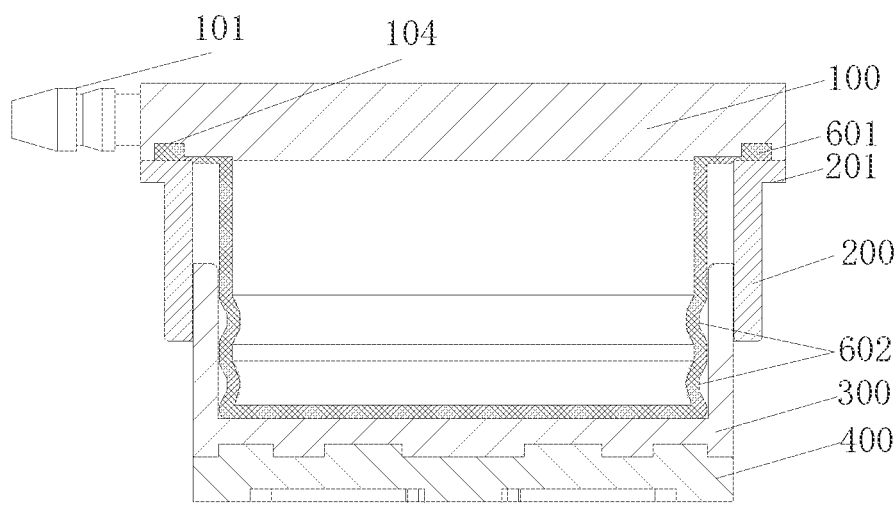
FIG. 25 is a sectional view of an implementation mode of a support for household appliance of embodiment V of the present disclosure.

Referring to FIG. 25, as an implementation mode of the embodiment, a hydraulic plate groove 104 is formed in the bottom face of the hydraulic plate 100, and the opening part 601 of the flexible accommodation body 600 is deformed under pressure of the end part of the sheath 200 and fills the hydraulic plate groove 104 for sealing. According to the embodiment, sealing is achieved through pressing the opening part 601 of the flexible accommodation body 600 to deform and to enter the hydraulic plate groove 104 during the fastening of the sheath 200, the structure is simple, and the operation is convenient.

Preferably, a volume enclosed by the hydraulic plate groove 104 and the end part of the sheath 200 is smaller than the volume of the opening part 601 of the flexible accommodation body 600. Thus, the opening part 601 of the flexible accommodation body 600 is in tight contact with the hydraulic plate groove 104 to ensure sealing performance.

Figure 26:
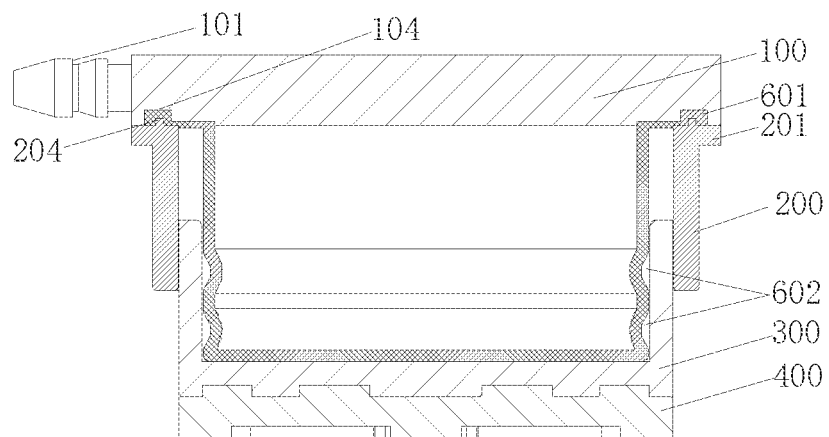
FIG. 26 is a sectional view of another implementation mode of the support for household appliance of embodiment V of the present disclosure.

Referring to FIG. 26, as another implementation mode of the embodiment, a sheath projecting part 204 which bulges from the end face is arranged at the end part of one end, connected with the hydraulic plate 100, of the sheath 200, and the opening part 601 of the flexible accommodation body 600 is deformed under pressure of the sheath projecting part 204 and fills the hydraulic plate groove 104 for sealing. According to the embodiment, the sheath projecting part 204 extends into the hydraulic plate groove 104 when the sheath 200 is fixed to the bottom face of the hydraulic plate 100, the sheath projecting part 204 further presses the opening part 601 of the flexible accommodation body 600 to be in close contact with the hydraulic plate groove 104, and thus, the sealing performance is enhanced.

Figure 27:
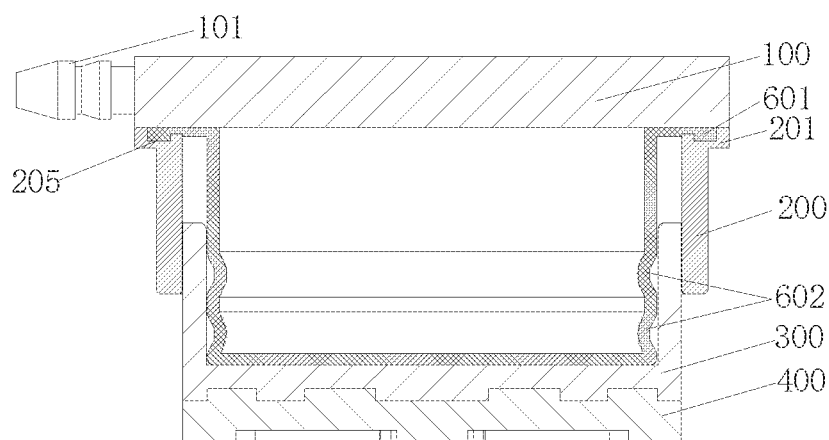
FIG. 27 is a sectional view of another implementation mode of the support for household appliance of embodiment V of the present disclosure.

Referring to FIG. 27, as another embodiment of the embodiment, a sheath groove 205 is formed in the end part of one end, connected with the hydraulic plate 100, of the sheath 200, the sheath 200 is fastened to the bottom face of the hydraulic plate 100, and the opening part 601 of the flexible accommodation body 600 deforms under the action of a fastening force and fills the sheath groove 205 for sealing. Thus, the bottom face of the hydraulic plate 100 is simply arranged as a planar structure, the opening part 601 of the flexible accommodation body 600 is deformed under pressure of the bottom face of the hydraulic plate 100 through fastening the sheath 200, and thus, the opening part enters the sheath groove 205 for sealing.

Figure 28:
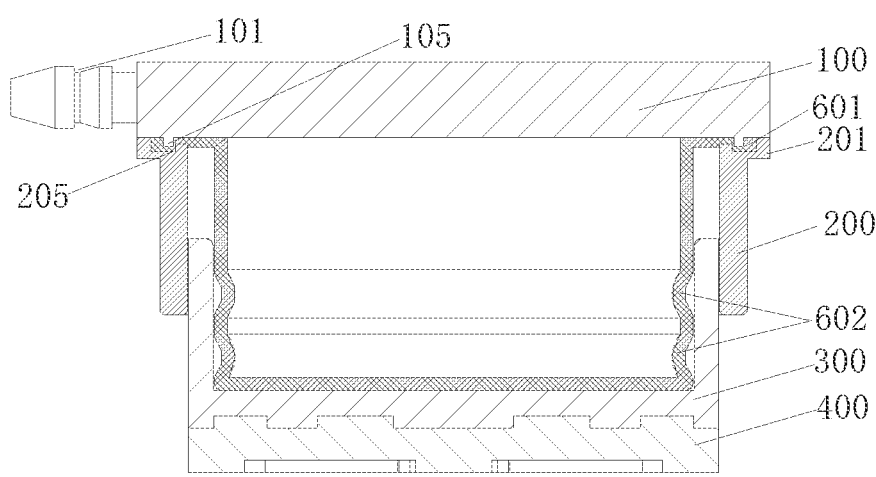
FIG. 28 is a sectional view of another implementation mode of the support for household appliance of embodiment V of the present disclosure.
Figure 29:
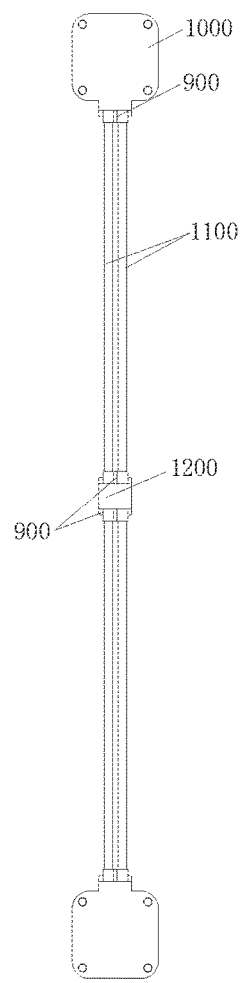
FIG. 29 is a top view of a support for household appliance of embodiment VI of the present disclosure.
Figure 30:
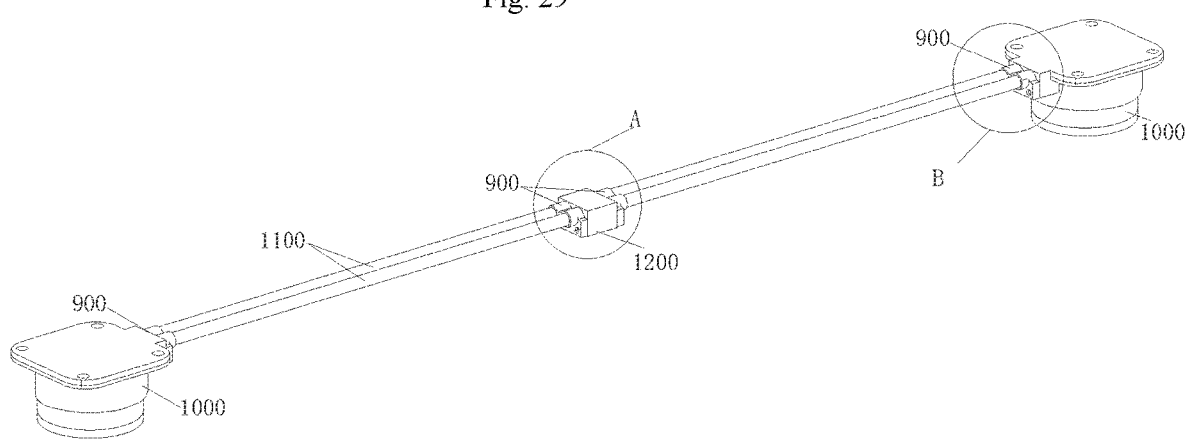
FIG. 30 is a stereogram of the support for household appliance of embodiment VI of the present disclosure.
Figure 31:
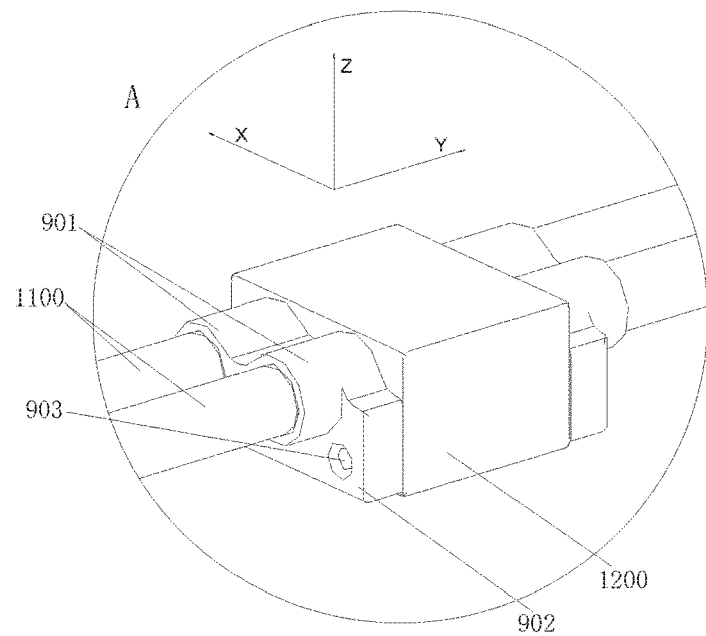
FIG. 31 is a local enlarged view of a position A in the FIG. 30 of embodiment VI of the present disclosure.
Figure 32:
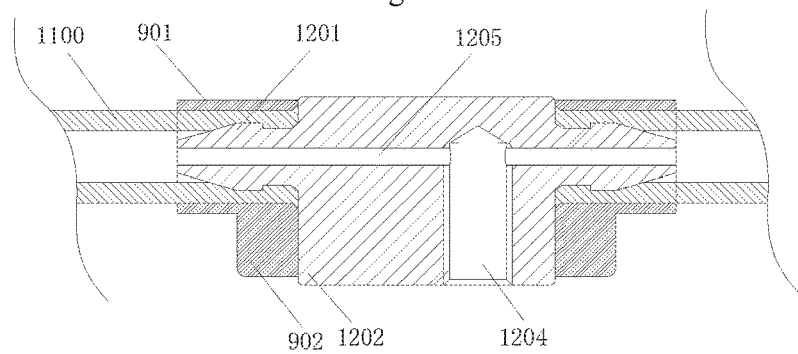
FIG. 32 is a sectional view of the FIG. 31 of embodiment VI of the present disclosure.
Figure 33:
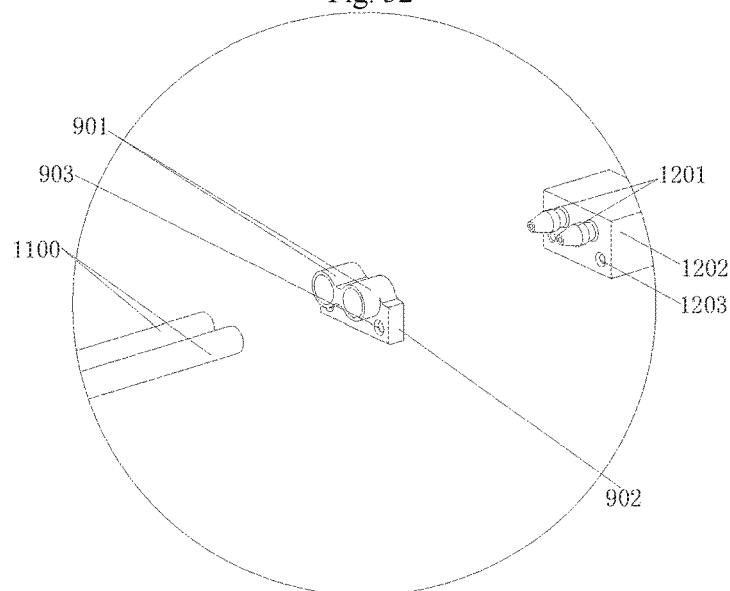
FIG. 33 is an exploded view of the FIG. 31 of embodiment VI of the present disclosure.
Figure 34:
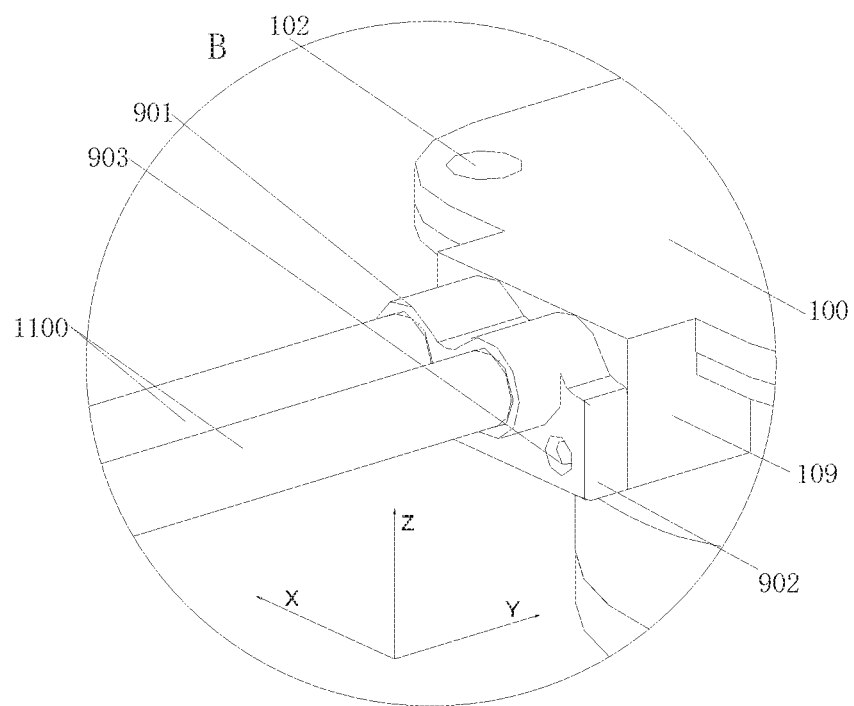
FIG. 34 is a local enlarged view of a position B in the FIG. 30 of embodiment VI of the present disclosure.
Figure 35:
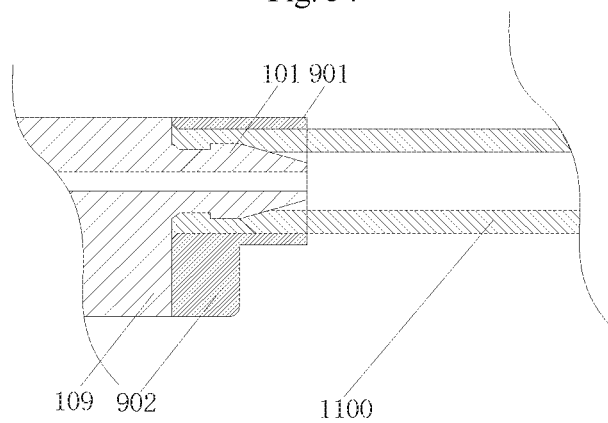
FIG. 35 is a sectional view of the FIG. 34 of embodiment VI of the present disclosure.

Referring to FIG. 28, as another implementation mode of the embodiment, a projecting annular bulge 105 is formed on the bottom face of the hydraulic plate 100, the sheath 200 is fixed to the bottom face of the hydraulic plate 100, and the opening part 601 of the flexible accommodation body 600 is deformed under pressure of the annular bulge 105 and fills the sheath groove 205 for sealing. According to the embodiment, the annular bulge 105 extends into the sheath groove 205 when the sheath 200 is fixed to the bottom face of the hydraulic plate 100, the annular bulge 105 further presses the opening part 601 of the flexible accommodation body 600 to be in close contact with the sheath groove 205, and thus, the sealing performance is enhanced.

As a preferred implementation mode of the embodiment, an upper limiting stopper, which is used for preventing the regulating support 300 from excessively moving upwards to be abutted against the flexible accommodation body 600, is arranged on the internal wall of the sheath 200.

And/or, one end, sleeved by the sheath 200, of the regulating support 300 is a smooth transition end.

Thus, the flexible accommodation body 600 is fastened and sealed to the hydraulic plate 100 through the sheath 200 without affecting the axial moving of the regulating support 300 in the sheath 200.

According to the support for household appliance, provided by the embodiment, the sheath 200 and fixing holes of the hydraulic plate 100 are further fastened to the bottom plate 700 of the household appliance by screws or bolts, so that the hydraulic plate 100 and the sheath 200 are compacted, and sealing has extremely high reliability.

Embodiment VI

Referring to FIG. 29 to FIG. 35, a support 1000 for a household appliance comprises a fixed part and a moving part, wherein a hollow chamber is formed between the fixed part and the moving part and the hollow chamber is provided with a hydraulic medium.

At least two household-appliance-used bottom feet 1000 communicate with one another through high-pressure pipes 1100; and the hydraulic medium circulate among the household-appliance-used bottom feet 1000 under the action of pressure to drive the moving part to extend and retract to achieve automatic leveling.

Liquid outlet nozzles 101 communicating with the hollow chamber are arranged on the fixed part, the high-pressure pipes 1100 are in sealed connection with the liquid outlet nozzles 101 through snap-in connecting members 900, and the snap-in connecting members 900 have reinforcing aprons 902 which are fit with the fixed part.

At least two household-appliance-used bottom feet 1000, provided by the embodiment, are respectively connected with the high-pressure pipes 1100 to achieve the communicating of the household-appliance-used bottom feet 1000, and thus, the hydraulic medium can circulate between two household-appliance-used bottom feet to achieve automatic leveling.

Connection between the high-pressure pipes 1100 and the household-appliance-used bottom feet 1000 is sealed through fastening connection of the snap-in connecting members 900, and thus, no liquid leakage is ensured. However, sloshing or impact of the high-pressure pipes 1100 is inevitable during the processes of production assembling, packaging, batch-production transportation, mounting and so on, the snap-in connecting members 900 have the reinforcing aprons 902 which are fit with the fixed part, and thus, the strength and compactness of the connection between the high-pressure pipes 1100 and the household-appliance-used bottom feet 1000 are improved.

Concretely, the high-pressure pipes 1100 sleeve on the liquid outlet nozzles 101, the snap-in connecting member 900 comprises a snap-in connecting part 901, the snap-in connecting part 901 sleeves on the high-pressure pipe 1100 to press the high-pressure pipe 1100 to be in sealed connection with the liquid outlet nozzle 101.

According to the embodiment, the reinforcing apron 902 is fixed to one side of the external wall of the snap-in connecting part 901, and one end of the reinforcing apron 902 is contact with the fixed part.

According to the embodiment, the snap-in connecting member 900 has the reinforcing apron 902, the reinforcing apron 902 can form a fitting face with the fixed part of the hydraulic plate 100, thus, great forces in X, Y and Z directions can be applied to the liquid outlet nozzles 101, and the liquid outlet nozzles 101 are prevented from bending under the action of the forces due to the fitting face of the reinforcing aprons 902 with the hydraulic plate 100.

Further, in the present embodiment, one end, close to the fixed part, of the reinforcing apron 902 bulges to the fixed part from one end, close to the fixed part, of the snap-in connecting part 901. Or one end, close to the fixed part, of the reinforcing apron is a same level with one end, close to the fixed part, of the snap-in connecting part 901. Thus, the reinforcing apron 902 is used for counteracting force acting on the liquid outlet nozzles 101 during the accident sloshing of the high-pressure pipes 1100 to prevent the liquid outlet nozzles from breaking.

Concretely, the snap-in connecting part 901 is a snap-in connecting sleeve; and the reinforcing apron 902 is a block which is fixed to one side of the snap-in connecting sleeve or fixed to a whole circumferential wall of the snap-in connecting sleeve.

As a preferred implementation mode of the embodiment, each liquid outlet nozzle 101 of the at least two liquid outlet nozzles 101 is connected with one high-pressure pipe 1100, and all the high-pressure pipes 1100 and the liquid outlet nozzles 101 are hermetically connected through the same snap-in connecting member 1200.

Preferably, the snap-in connecting member 1200 comprises a plurality of snap-in connecting parts 901, each snap-in connecting part is in snap-in connection with one high-pressure pipe correspondingly, and the reinforcing apron 902 is fixedly connected with all the snap-in connecting parts 901.

As a preferred implementation mode of the embodiment, the fixed part comprises a hydraulic plate 100 and a sheath 200 fixedly connected with the hydraulic plate 100, and the moving part is a regulating support 300 which is arranged in the sheath 200 and is axially movable relative to the sheath 200; and the liquid outlet nozzles 101 are arranged on the hydraulic plate 100, and the reinforcing apron 902 of the snap-in connecting member 900 is in contact with the sidewall of one side, where the liquid outlet nozzles are arranged, of the hydraulic plate 100.

Concretely, the projecting base part 109 is further formed on the bottom face of the hydraulic plate 100, and the liquid outlet nozzles 101 are arranged on the base part 109; and the reinforcing apron 902 of the snap-in connecting member 900 is in contact with the base part 109.

Further, the reinforcing apron of the snap-in connecting member is fixed to the fixed part.

Preferably, a first fixing hole 903 is formed in the reinforcing apron 902, a second fixing hole is formed in the fixed part, and the reinforcing apron 902 and the fixed part are fixedly connected by enabling screws through the first fixing hole 903 and the second fixing hole.

Further, the liquid outlet nozzles 101 of the two household-appliance-used bottom feet 1000 are connected to the same communicating member 1200 through the high-pressure pipes 1100 to achieve communicating between the two household-appliance-used bottom feet 1000.

The communicating member 1200 is provided with communicating member liquid outlet nozzles 1201 which are used for being connected with the high-pressure pipes 1100, the high-pressure pipes 1100 and the communicating member liquid outlet nozzles 1201 are hermetically connected through the snap-in connecting members 900, and the reinforcing apron 902 of the snap-in connecting member 900 is in contact with the communicating member 1200.

Preferably, the reinforcing apron 902 of the snap-in connecting member 900 is in contact with the communicating member 1200 and is fixedly connected with the communicating member 1200. Preferably, a third fixing hole 1203 is formed in the communicating member 1200, and the reinforcing apron 902 and the communicating member 1200 are fixedly connected by enabling screws through the first fixing hole 903 and the third fixing hole 1203.

Concretely, the support for household appliance 1000, provided by the embodiment, comprises two liquid outlet nozzles 101, the communicating member 1200 comprises four communicating member liquid outlet nozzles 1201 which communicate with each other pairwise; two communicating member liquid outlet nozzles 1201 which communicate with each other respectively communicate with the liquid outlet nozzles 101 of the two household-appliance-used bottom feet through the high-pressure pipes 1100.

According to the embodiment, the communicating member 1200 comprises a main cavity 1202, two communicating member liquid outlet nozzles 1201 are respectively arranged at the two ends of the main cavity 1202, and the interior of the main cavity 1202 has two flow passages 1205 which communicate with the four communicating member liquid outlet nozzles 1201 at the two ends of the main cavity pairwise.

According to the embodiment, oil charging holes 1204 and vent holes are respectively formed in the main cavity 1202 corresponding to the two flow passages 1205, and sealing members are mounted on the oil charging holes 1204 and the vent holes.

According to the embodiment, the two communicating household-appliance-used bottom feet 1000 have regulating supports 300; and when the household appliance is provided with the household-appliance-used bottom feet, provided by the embodiment, different household-appliance-used bottom feet 1000 are different in horizontal height due to an out-of-flat ground surface, the regulating supports 300 can stretch and contract like a piston to achieve the same internal hydraulic pressure, and thus, the automatic regulating of the household-appliance-used bottom feet 1000 is completed.

Embodiment VII

The support for household appliance, provided by the embodiment, comprises a hydraulic plate 100, which is internally provided with a liquid flow passage 107;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300;

and a flexible accommodation body 600, which accommodates a liquid medium and is arranged in the accommodation chamber;

and the flexible accommodation body 600 extends and retracts to drive the regulating support 300 to axially move in the sheath 200 for leveling under the action of pressure.

The support for household appliance further comprises a rubber gasket 400 which is fixed to the bottom of the regulating support 300, the bottom of the rubber gasket 400 has designed patterns 401, thus, the friction force to the ground is increased, and the stability is enhanced.

Embodiment VIII

The embodiment also provides a household appliance with the support for household appliance, provided by any one of the above-mentioned embodiments. The household appliance comprises a casing, wherein a plurality of household-appliance-used bottom feet are mounted at the bottom of the casing, and a hydraulic medium being provided in the household-appliance-used bottom feet 1000 circulates among the household-appliance-used bottom feet for leveling.

According to the embodiment of the present disclosure, taking a washing machine for example, a principle and a method for automatic leveling of the washing machine by using the support for household appliance, provided by the present disclosure, are elaborated. After the washing machine is mounted, different household-appliance-used bottom feet are different in horizontal height due to an out-of-flat ground surface, and the household-appliance-used bottom feet located at pits of the ground surface are low in position. Thus, the household-appliance-used bottom feet at high positions firstly bear the weight of the washing machine and bear a large gravity force, and the household-appliance-used bottom feet at low positions bear a small gravity force due to weak legs.

Regulating supports of the household-appliance-used bottom feet at high positions move up under high pressure, heights of the entire bottom feet are reduced, thus, volumes of hollow chambers of flexible accommodation bodies full of the hydraulic medium are compressed and reduced, the hydraulic medium is forced to enter throttling holes or valve holes and enter the household-appliance-used bottom feet at low positions through high-pressure pipes, thus, the hydraulic medium in flexible accommodation bodies of the household-appliance-used bottom feet at low positions becomes more and more, and the flexible accommodation bodies are expanded to promote the stretching of the regulating supports.

When the bottom feet at high positions and the bottom feet at low positions are the same in hydraulic pressure, the hydraulic medium does not flow in the high-pressure pipes any more, relative positions of the regulating supports and a bottom plate of the washing machine do not change any more, and the automatic regulating of the washing machine is completed.

During the washing or spin-drying of the washing machine, the hydraulic medium can also slowly flow for self-leveling, so that vibration noises of the washing machine are greatly lowered.

In addition, the support for household appliance, provided by each of the above-mentioned embodiments of the present disclosure, can also be applied to household appliances such as electric refrigerators, coolers and air-conditioner indoor units, besides washing machines.

It is necessary to note that each of the above-mentioned embodiments of the present disclosure can be implemented independently and can also be implemented by combining a plurality of embodiments.

The above-mentioned embodiments are only preferred embodiments of the present disclosure, but not intended to limit the present disclosure in any form. Although the present disclosure has been described in terms of preferred embodiments, it is not intended to be limited to these disclosed embodiments. Equivalent embodiments, of which some changes or modifications are equivalent changes, may be made by any skilled in the art by using the above-mentioned technical contents without departing from the technical scheme scope of the present disclosure. However, all simple amendments, equivalent changes and modifications made to the above embodiments according to the technical essence of the present disclosure without departing from the technical scheme scope of the present disclosure all still fall within the protection scope of the present disclosure.

The invention claimed is:

1. A support for a household appliance, comprising:
   a hydraulic plate internally provided with a liquid flow passage;
   a sheath fixedly connected with the hydraulic plate;
   a regulating support arranged in the sheath and axially movable relative to the sheath;
   an accommodation chamber formed by the hydraulic plate, the sheath and the regulating support; and
   a flexible accommodation body configured to accommodate a liquid medium and arranged in the accommodation chamber;
   the flexible accommodation body configured to extend and retract to drive the regulating support to axially move in the sheath for leveling under an action of pressure;
   wherein the flexible accommodation body is provided an opening part, and the opening part is mounted on the hydraulic plate through the sheath in a sealed manner and communicates with the liquid flow passage; and
   an upper end of the sheath is fixedly connected with the hydraulic plate and presses the opening part of the flexible accommodation body onto the hydraulic plate for sealed connection.

2. The support for the household appliance according to claim 1, wherein the upper end of the sheath is flanged to form a mounting plane, the mounting plane is fit with a bottom face of the hydraulic plate and is in fastened connection with the bottom face of the hydraulic plate through a connecting device, and the opening part of the flexible accommodation body is tightly pressed to the mounting plane and the bottom face of the hydraulic plate for sealed connection.

3. The support for the household appliance according to claim 1, wherein the flexible accommodation body comprises an accommodating body, a chamber used for accommodating the liquid medium is formed inside the accommodating body, an opening end of the accommodating body outwards extends to form the opening part; and the accommodating body is arranged in the accommodation chamber, and the opening part extends into a connection part of the sheath and the hydraulic plate and is tightly sealed.

4. The support for the household appliance according to claim 1, wherein a hydraulic plate groove is formed in the bottom face of the hydraulic plate, and the opening part of the flexible accommodation body is deformed under pressure of an end part of the sheath and fills in the hydraulic plate groove for sealing.

5. The support for the household appliance according to claim 4, wherein a sheath projecting part bulges from an end face of one end, connected with the hydraulic plate, of the sheath, and the opening part of the flexible accommodation body is deformed under pressure of the sheath projecting part and fills the hydraulic plate groove for sealing.

6. The support for the household appliance according to claim 4, wherein a volume enclosed by the end part of the sheath and the hydraulic plate groove is smaller than a volume of the opening part of the flexible accommodation body.

7. The support for the household appliance according to claim 1, wherein a sheath groove is formed in an end part of one end, connected with the hydraulic plate, of the sheath; the sheath is fastened to the bottom face of the hydraulic plate, and the opening part of the flexible accommodation body deforms and fills the sheath groove for sealing.

8. The support for the household appliance according to claim 7, wherein a projecting annular bulge is formed on the bottom face of the hydraulic plate, the sheath is fixed to the bottom face of the hydraulic plate, and the opening part of the flexible accommodation body is deformed under pressure of the annular bulge and fills the sheath groove for sealing.

9. The support for the household appliance according to claim 1, wherein an upper limiting stopper, for preventing the regulating support from excessively moving upwards to be abutted against the flexible accommodation body, is arranged on an internal wall of the sheath;
   and/or, one end, sleeved by the sheath, of the regulating support is a smooth transition end.

10. A household appliance with the support for household appliance according to claim 1.

* * * * *